(12) United States Patent
Taherzadeh Boroujeni et al.

(10) Patent No.: US 11,903,037 B2
(45) Date of Patent: Feb. 13, 2024

(54) REQUESTS FOR PHYSICAL UPLINK SHARED CHANNEL REPETITION ASSOCIATED WITH A RADIO RESOURCE CONTROL CONNECTION REQUEST MESSAGE IN A RANDOM ACCESS CHANNEL PROCEDURE

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 17/646,393

(22) Filed: Dec. 29, 2021

(65) Prior Publication Data

US 2022/0232644 A1 Jul. 21, 2022

Related U.S. Application Data

(60) Provisional application No. 63/141,299, filed on Jan. 25, 2021, provisional application No. 63/138,210, filed on Jan. 15, 2021.

(51) Int. Cl.
*H04W 74/08* (2009.01)
*H04W 56/00* (2009.01)
*H04W 74/00* (2009.01)
*H04L 1/08* (2006.01)

(52) U.S. Cl.
CPC ..... *H04W 74/0841* (2013.01); *H04W 56/001* (2013.01); *H04W 74/008* (2013.01); *H04W 74/0866* (2013.01)

(58) Field of Classification Search
CPC .......... H04W 74/0841; H04W 56/001; H04W 74/008; H04W 74/0866; H04W 74/004; H04L 1/08
See application file for complete search history.

(56) References Cited

U.S. PATENT DOCUMENTS

2021/0352689 A1* 11/2021 Jung ................. H04W 72/1268
2022/0272759 A1* 8/2022 Grau ................. H04W 74/0833
2023/0060894 A1* 3/2023 Rastegardoost .... H04W 56/001
(Continued)

FOREIGN PATENT DOCUMENTS

WO WO-2020060075 A1 3/2020

OTHER PUBLICATIONS

3GPP TSG RAN WG1 #103-e R1-2008080 (Year: 2020).*
(Continued)

*Primary Examiner* — Harry H Kim
(74) *Attorney, Agent, or Firm* — QUALCOMM Incorporated

(57) ABSTRACT

Various aspects of the present disclosure generally relate to wireless communication. In some aspects, a user equipment (UE) may transmit, to a base station, a request for physical uplink shared channel (PUSCH) repetition associated with a radio resource control (RRC) connection request message of a random access channel (RACH) procedure. The UE may transmit at least one PUSCH repetition associated with the RRC connection request message based at least in part on the request. Numerous other aspects are described.

50 Claims, 12 Drawing Sheets

(56) References Cited

U.S. PATENT DOCUMENTS

| | | | | |
|---|---|---|---|---|
| 2023/0074439 A1* | 3/2023 | Lin | ................... | H04W 74/0833 |
| 2023/0085104 A1* | 3/2023 | Park | ................... | H04W 74/008 |
| | | | | 370/329 |
| 2023/0156823 A1* | 5/2023 | Xu | ....................... | H04W 76/27 |
| | | | | 370/329 |

OTHER PUBLICATIONS

China Telecom: "Discussion on Msg3 PUSCH Enhancements", 3GPP TSG RAN WG1 #103-e, 3GPP Draft, R1-2007996, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, pp. 1-2, Oct. 16, 2020 (Oct. 16, 2020), XP051939426, Retrieved from the Internet: URL: https://ftp.3gpp.org/tsg_ran/WG1_RL1/SGR1_103-e/Docs/R1-2007996.zip R1-2007996.doc [retrieved on Oct. 16, 2020] Section 2, p. 1-p. 2.

International Search Report and Written Opinion—PCT/US2022/070082—ISA/EPO—dated Apr. 26, 2022.

NEC: "Discussion on Msg3 Coverage Enhancement", 3GPP Draft, R1-2008080, 3GPP TSG RAN WG1 #103-e, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 16, 2020 (Oct. 16, 2020), XP051939457, 2 Pages, Retrieved from the Internet: URL: https://ftp.3gpp.org/tsg_ran/WG1_RL1/TSGR1_103-e/Docs/R1-2008080.zip R1-2008080 Discussion on Msg3 coverage enhancement.docx [retrieved on Oct. 16, 2020] Sections 2.1. and 2.2, p. 1-p. 2.

* cited by examiner

REQUESTS FOR PHYSICAL UPLINK SHARED CHANNEL REPETITION ASSOCIATED WITH A RADIO RESOURCE CONTROL CONNECTION REQUEST MESSAGE IN A RANDOM ACCESS CHANNEL PROCEDURE

CROSS-REFERENCE TO RELATED APPLICATION

This patent application claims priority to U.S. Provisional Patent Application No. 63/138,210, filed on Jan. 15, 2021, entitled "REQUESTS FOR PHYSICAL UPLINK SHARED CHANNEL REPETITION ASSOCIATED WITH A RADIO RESOURCE CONTROL CONNECTION REQUEST MESSAGE IN A RANDOM ACCESS CHANNEL PROCEDURE," and to U.S. Provisional Patent Application No. 63/141,299, filed on Jan. 25, 2021, entitled "COMMUNICATION OF PHYSICAL UPLINK SHARED CHANNEL REPETITION INFORMATION USING SPECIFIC FREQUENCY RESOURCES FOR A PHYSICAL RANDOM ACCESS CHANNEL MESSAGE," each of which is assigned to the assignee hereof. The disclosures of the prior applications are considered part of and are incorporated by reference into this patent application.

FIELD OF THE DISCLOSURE

Aspects of the present disclosure generally relate to wireless communication and to techniques and apparatuses for requests for physical uplink shared channel repetition associated with a radio resource control connection request message in a random access channel procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory; and one or more processors coupled to the memory, the one or more processors configured to: transmit, to a base station, a request for physical uplink shared channel (PUSCH) repetition associated with a radio resource control (RRC) connection request message of a random access channel (RACH) procedure; and transmit at least one PUSCH repetition associated with the RRC connection request message based at least in part on the request.

In some aspects, a base station for wireless communication includes a memory; and one or more processors coupled to the memory, the one or more processors configured to: receive, from a UE, a request for PUSCH repetition associated with an RRC connection request message of a RACH procedure; and receive at least one PUSCH repetition associated with the RRC connection request message based at least in part on the request.

In some aspects, a method of wireless communication performed by a UE includes transmitting, to a base station, a request for PUSCH repetition associated with an RRC connection request message of a RACH procedure; and transmitting at least one PUSCH repetition associated with the RRC connection request message based at least in part on the request.

In some aspects, a method of wireless communication performed by a base station includes receiving, from a UE, a request for PUSCH repetition associated with an RRC connection request message of a RACH procedure; and receiving at least one PUSCH repetition associated with the RRC connection request message based at least in part on the request.

In some aspects, a non-transitory computer-readable medium storing a set of instructions for wireless communication includes one or more instructions that, when executed by one or more processors of a UE, cause the UE to: transmit, to a base station, a request for PUSCH repetition associated with an RRC connection request message of a RACH procedure; and transmit at least one PUSCH repetition associated with the RRC connection request message based at least in part on the request.

In some aspects, a non-transitory computer-readable medium storing a set of instructions for wireless communication includes one or more instructions that, when executed by one or more processors of a base station, cause the base station to: receive, from a UE, a request for PUSCH repetition associated with an RRC connection request message of a RACH procedure; and receive at least one PUSCH repetition associated with the RRC connection request message based at least in part on the request.

In some aspects, an apparatus for wireless communication includes means for transmitting, to a base station, a request for PUSCH repetition associated with an RRC connection request message of a RACH procedure; and means for transmitting at least one PUSCH repetition associated with the RRC connection request message based at least in part on the request.

In some aspects, an apparatus for wireless communication includes means for receiving, from a UE, a request for PUSCH repetition associated with an RRC connection request message of a RACH procedure; and means for receiving at least one PUSCH repetition associated with the RRC connection request message based at least in part on the request.

Some aspects described herein relate to a UE for wireless communication. The user equipment may include a memory and one or more processors coupled to the memory. The one or more processors may be configured to transmit, to a base station and based at least in part on a determination that one or more trigger criteria are satisfied, a PRACH message that includes a request for PUSCH repetition associated with an RRC connection request message of a RACH procedure, wherein the one or more trigger criteria comprise a reference signal received power threshold. The one or more processors may be configured to transmit at least one PUSCH repetition associated with the RRC connection request message based at least in part on the request.

Some aspects described herein relate to a UE for wireless communication. The user equipment may include a memory and one or more processors coupled to the memory. The one or more processors may be configured to transmit, to a base station and based at least in part on a determination that one or more trigger criteria are satisfied, a PRACH message that includes a request for PUSCH repetition associated with an RRC connection request message of a RACH procedure, wherein the one or more trigger criteria comprise a reference signal received power threshold. The one or more processors may be configured to receive, from the base station, an indication of a PUSCH repetition request grant, wherein the PUSCH repetition request grant corresponds to at least a portion of the PUSCH repetition request. The one or more processors may be configured to transmit at least one PUSCH repetition associated with the RRC connection request message based at least in part on the request.

Some aspects described herein relate to a base station for wireless communication. The base station may include a memory and one or more processors coupled to the memory. The one or more processors may be configured to receive, from a UE, a request for PUSCH repetition associated with an RRC connection request message of a RACH procedure. The one or more processors may be configured to receive at least one PUSCH repetition associated with the RRC connection request message based at least in part on the request.

Some aspects described herein relate to a method of wireless communication by a UE. The method may include determining one or more alternate frequency resources for a PRACH transmission, wherein a use of the one or more alternate frequency resources communicates PUSCH repetition information. The method may include transmitting, to a base station, a PRACH message using the one or more alternate frequency resources to communicate the PUSCH repetition information.

Some aspects described herein relate to a method of wireless communication by a base station. The method may include receiving, from a UE, a PRACH message using one or more alternate frequency resources for a PRACH transmission. The method may include determining PUSCH repetition information based on the one or more alternate frequency resources used to receive the PRACH message, wherein a use of the one or more alternate frequency resources communicates the PUSCH repetition information.

Some aspects described herein relate to a UE for wireless communication. The user equipment may include a memory and one or more processors coupled to the memory. The one or more processors may be configured to determine one or more alternate frequency resources for a PRACH transmission, wherein a use of the one or more alternate frequency resources communicates PUSCH repetition information. The one or more processors may be configured to transmit, to a base station, a PRACH message using the one or more alternate frequency resources to communicate the PUSCH repetition information.

Some aspects described herein relate to a base station for wireless communication. The base station may include a memory and one or more processors coupled to the memory. The one or more processors may be configured to receive, from a UE, a PRACH message using one or more alternate frequency resources for a PRACH transmission. The one or more processors may be configured to determine PUSCH repetition information based on the one or more alternate frequency resources used to receive the PRACH message, wherein a use of the one or more alternate frequency resources communicates the PUSCH repetition information.

Some aspects described herein relate to a non-transitory computer-readable medium that stores a set of instructions for wireless communication by a UE. The set of instructions, when executed by one or more processors of the UE, may cause the UE to determine one or more alternate frequency resources for a PRACH transmission, wherein a use of the one or more alternate frequency resources communicates PUSCH repetition information. The set of instructions, when executed by one or more processors of the UE, may cause the UE to transmit, to a base station, a PRACH message using the one or more alternate frequency resources to communicate the PUSCH repetition information.

Some aspects described herein relate to a non-transitory computer-readable medium that stores a set of instructions for wireless communication by a base station. The set of instructions, when executed by one or more processors of the base station, may cause the base station to receive, from a UE, a PRACH message using one or more alternate frequency resources for a PRACH transmission. The set of instructions, when executed by one or more processors of the base station, may cause the base station to determine PUSCH repetition information based on the one or more alternate frequency resources used to receive the PRACH message, wherein a use of the one or more alternate frequency resources communicates the PUSCH repetition information.

Some aspects described herein relate to an apparatus for wireless communication. The apparatus may include means for determining one or more alternate frequency resources for a PRACH transmission, wherein a use of the one or more alternate frequency resources communicates PUSCH repetition information. The apparatus may include means for transmitting, to a base station, a PRACH message using the one or more alternate frequency resources to communicate the PUSCH repetition information.

Some aspects described herein relate to an apparatus for wireless communication. The apparatus may include means for receiving, from a UE, a PRACH message using one or more alternate frequency resources for a PRACH transmission. The apparatus may include means for determining PUSCH repetition information based on the one or more alternate frequency resources used to receive the PRACH message, wherein a use of the one or more alternate frequency resources communicates the PUSCH repetition information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
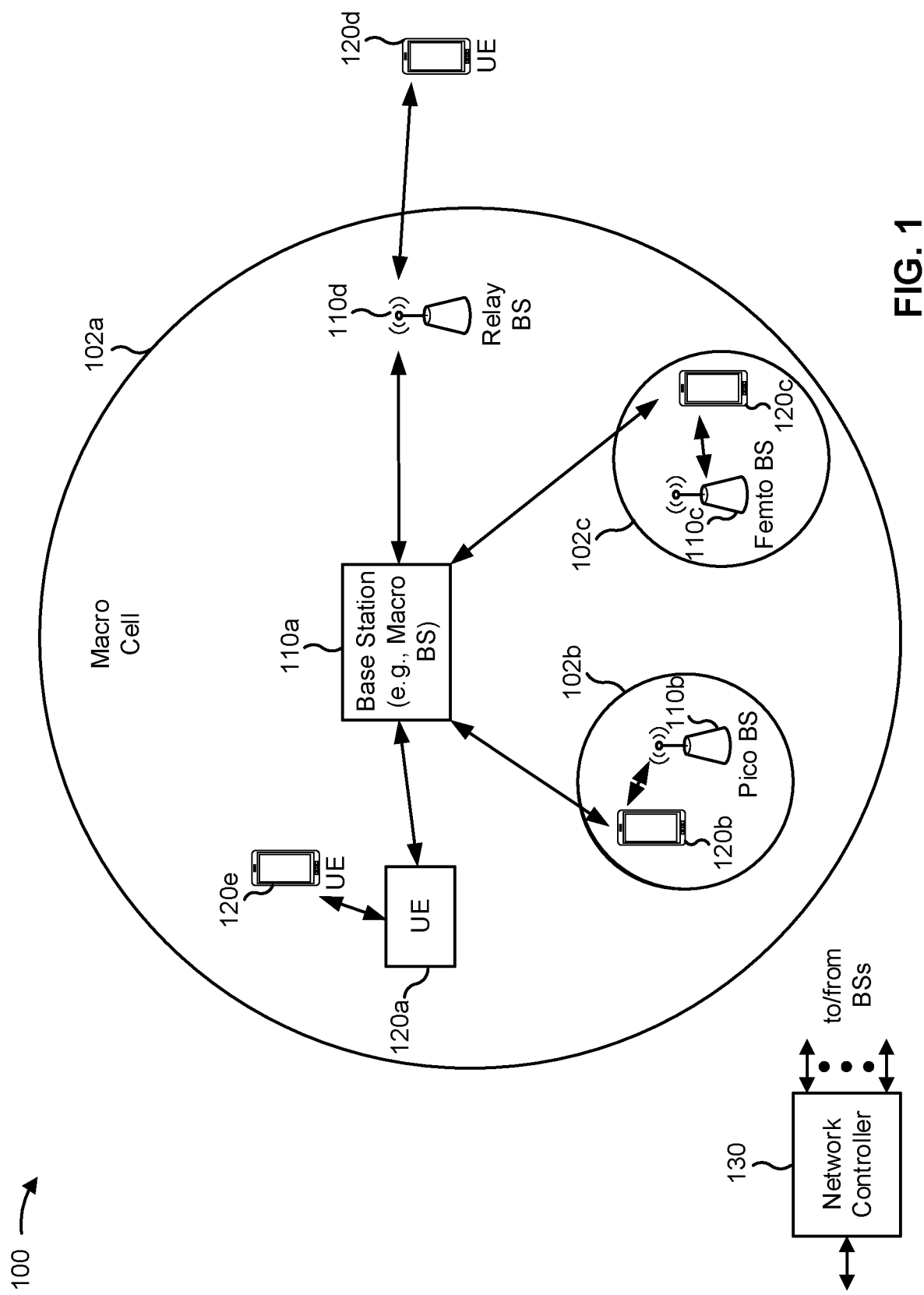
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
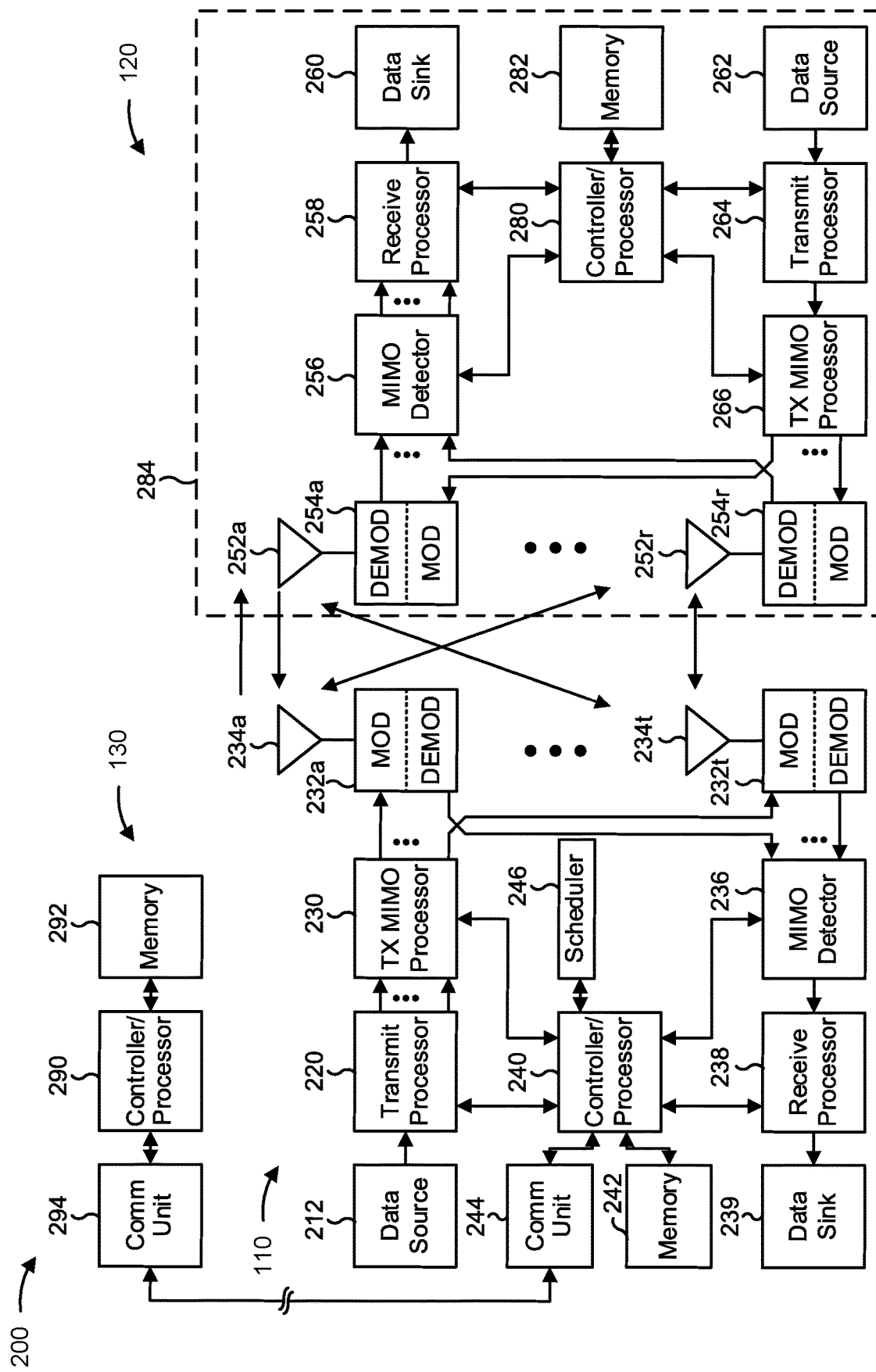
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-12).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-12).

Controller/processor 240 of base station 110, controller/processor 280 of UE 120, and/or any other component(s) of FIG. 2 may perform one or more techniques associated with requests for physical uplink shared channel (PUSCH) repetition associated with a radio resource control (RRC) connection request message in a RACH procedure, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the UE includes means for transmitting, to a base station, a request for PUSCH repetition associated with an RRC connection request message of a random access channel (RACH) procedure; or means for transmitting at least one PUSCH repetition associated with the RRC connection request message based at least in part on the request. In some aspects, the UE includes means for selecting the one or more physical random access channel (PRACH) parameters based at least in part on a relationship between the one or more PRACH parameters and one or more request parameters corresponding to the request for PUSCH repetition. In some aspects, the UE includes means for receiving, from the base station, a parameter configuration that indicates the relationship. In some aspects, the UE includes means for determining that one or more trigger criteria are satisfied, wherein transmitting the request for PUSCH repetition comprises transmitting the request for PUSCH repetition based at least in part on determining that the one or more trigger criteria are satisfied. In some aspects, the UE includes means for receiving, from the base station, a trigger configuration that indicates the one or more trigger criteria.

In some aspects, the UE includes means for determining a first synchronization signal block (SSB) based RSRP, wherein determining that the one or more trigger criteria are satisfied comprises determining that the first SSB based RSRP satisfies the first RSRP threshold. In some aspects, the UE includes means for determining a second SSB based RSRP, wherein determining that the one or more trigger criteria are satisfied comprises determining that the second SSB based RSRP satisfies the second RSRP threshold. In some aspects, the UE includes means for receiving, from the base station, a random access response (RAR) message, wherein the RAR message indicates at least one of: means for determining, based at least in part on the RAR message, at least one of a PUSCH repetition parameter or a PUSCH repetition resource. In some aspects, the UE includes means for receiving, from the base station, an indication of a PUSCH repetition request grant, wherein the PUSCH repetition request grant corresponds to at least a portion of the PUSCH repetition request.

In some aspects, the UE includes means for determining one or more alternate frequency resources for a PRACH transmission, wherein a use of the one or more alternate frequency resources communicates PUSCH repetition information; and/or means for transmitting, to a base station, a PRACH message using the one or more alternate frequency resources to communicate the PUSCH repetition information.

The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station includes means for receiving, from a UE, a request for PUSCH repetition associated with an RRC connection request message of a RACH procedure; or means for receiving at least one PUSCH repetition associated with the RRC connection request message based at least in part on the request. In some aspects, the base station includes means for transmitting, to the UE, a parameter configuration that indicates the relationship. In some aspects, the base station includes means for transmitting, to the UE, a trigger configuration that indicates the one or more trigger criteria. In some aspects, the base station includes means for transmitting, to the UE, an RAR message. In some aspects, the base station includes means for transmitting, to the UE, an indication of a PUSCH repetition request grant, wherein the PUSCH repetition request grant corresponds to at least a portion of the PUSCH repetition request.

In some aspects, the base station includes means for receiving, from a UE, a PRACH message using one or more alternate frequency resources for a PRACH transmission; and/or means for determining PUSCH repetition information based on the one or more alternate frequency resources used to receive the PRACH message, wherein a use of the one or more alternate frequency resources communicates the PUSCH repetition information.

The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
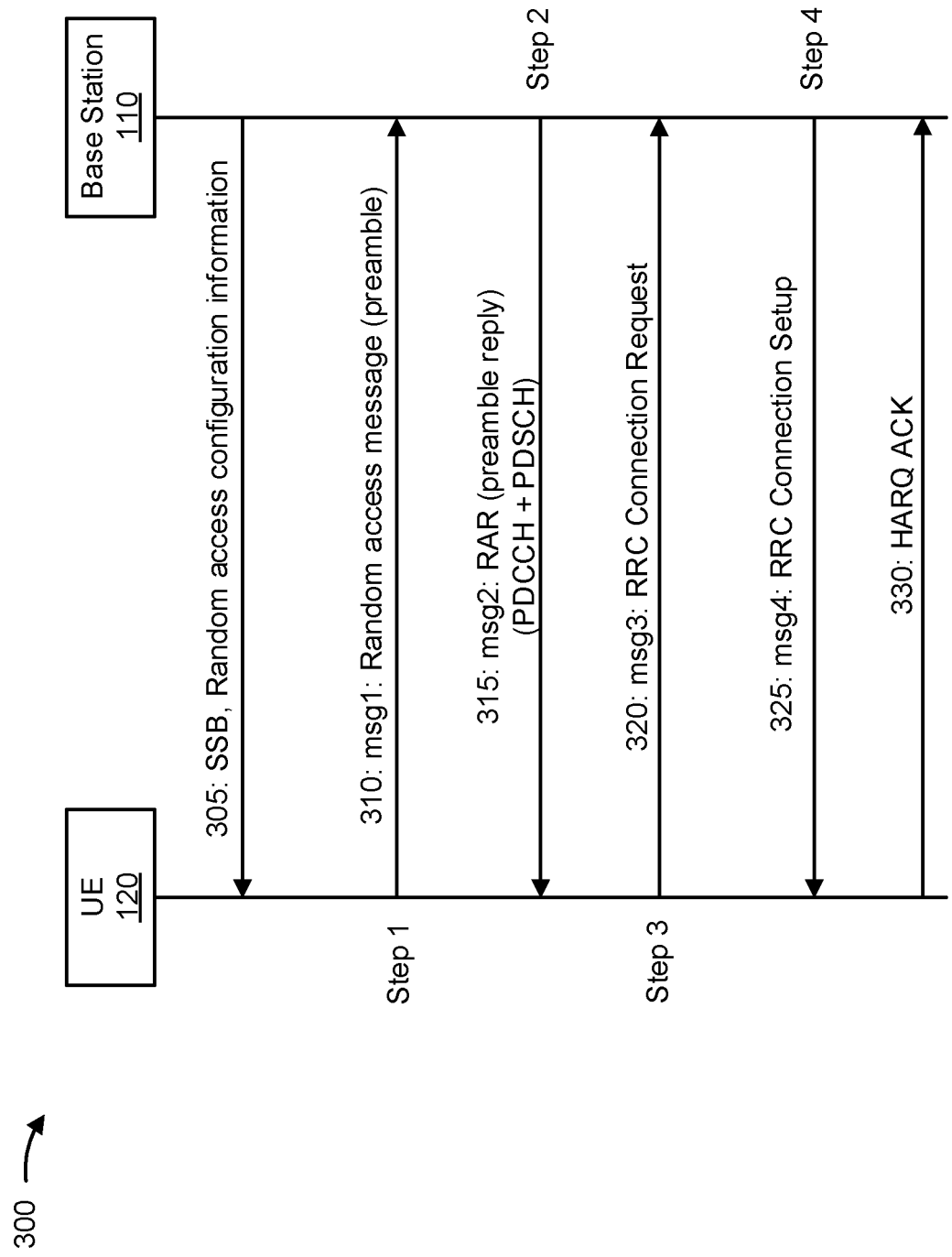
FIG. 3 a diagram illustrating an example of a four-step random access channel (RACH) operation, in accordance with the present disclosure.

FIG. 3 is a diagram illustrating an example of a four-step RACH operation, in accordance with the present disclosure. As shown in FIG. 3, a base station 110 and a UE 120 may communicate with one another to perform the four-step random access procedure.

As shown by reference number 305, the base station 110 may transmit, and the UE 120 may receive, one or more SSBs and random access configuration information. In some aspects, the random access configuration information may be transmitted in and/or indicated by system information (e.g., in one or more system information blocks (SIBs), among other examples) and/or an SSB, such as for contention-based random access. Additionally, or alternatively, the random access configuration information may be transmitted in an RRC message and/or a physical downlink control channel (PDCCH) order message that triggers a RACH procedure, such as for contention-free random access. The random access configuration information may include one or more parameters to be used in the random access procedure, such as one or more parameters for transmitting a random access message (RAM) and/or one or more parameters for receiving an RAR, among other examples.

As shown by reference number 310, the UE 120 may transmit a RAM with a RACH request via a PRACH. The RAM may include a preamble (sometimes referred to as a random access preamble, a PRACH preamble, and/or a RAM preamble, among other examples). The message that includes the preamble may be referred to as a message 1, msg1, MSG1, a first message, and/or an initial message, among other examples in a four-step random access procedure. The random access message may include a random access preamble identifier.

As shown by reference number 315, the base station 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3) (see below).

In some aspects, as part of the second step of the four-step random access procedure, the base station 110 may transmit a PDCCH communication for the RAR. The PDCCH communication may schedule a physical downlink shared channel (PDSCH) communication that includes the RAR. For example, the PDCCH communication may indicate a resource allocation for the PDSCH communication. Also, as part of the second step of the four-step random access procedure, the base station 110 may transmit the PDSCH communication for the RAR, as scheduled by the PDCCH communication. The RAR may be included in a MAC protocol data unit (PDU) of the PDSCH communication.

As shown by reference number 320, the UE 120 may transmit an RRC connection request message. The RRC connection request message may be referred to as message 3, msg3, MSG3, a UE identification message, or a third message of a four-step random access procedure. In some aspects, the RRC connection request may include a UE identifier, uplink control information (UCI), and/or a PUSCH communication (e.g., an RRC connection request), among other examples.

As shown by reference number 325, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information, among other examples. As shown by reference number 330, if the UE 120 successfully receives the RRC connection setup message, the UE 120 may transmit a hybrid automatic repeat request (HARD) acknowledgement (ACK).

RACH procedures may have coverage limitations, which may cause negative impacts on network performance. In some cases, RACH messages at frequency ranges of greater than or equal to about 24 Gigahertz may be missed by UEs or inaccurately decoded by UEs. As a result, RRC connection setup messages may not be transmitted effectively, compromising network connection. Repetition of PUSCH associated with RRC connection setup messages may facilitate more effective coverage. To perform a PUSCH repetition, a UE may communicate PUSCH repetition information to the base station, so as to schedule the PUSCH repetition. The PUSCH repetition information may include a request for a PUSCH repetition and/or an indication of a UE capability for the PUSCH repetition. However, scheduling PUSCH repetition for UEs for which coverage is not an issue may result in inefficiencies that cause resources to be wasted. Additionally, transmitting the PUSCH repetition information as a part of data transmitted to the base station may not be an efficient use of resources.

Aspects of techniques described herein may facilitate efficient PUSCH repetition associated with RRC connection setup request messages during RACH procedures. For example, aspects may enable a UE to request PUSCH repetition and/or parameters of PUSCH repetition. Thus, aspects may enable PUSCH repetition only when, and to the extent, that it may benefit a UE, which may result in efficient coverage enhancement for RRC connection, which may positively impact network performance, thereby saving resources (e.g., computing, memory, communication, and network resources) that would be wasted in connection with scheduling PUSCH repetition for UEs for which coverage is not an issue.

According to some aspects of the disclosure, a UE may utilize particular frequency resources to communicate PUSCH repetition information to a base station, where the use of the particular frequency resources communicates the PUSCH repetition information. For example, the UE may utilize regular frequency resources for a PRACH transmission associated a single PUSCH transmission without any PUSCH repetition. On the other hand, the UE may utilize alternate frequency resources for a PRACH transmission to communicate the PUSCH repetition information, where the use of the alternate frequency resources may communicate the PUSCH repetition information. Hence, for example, a use of specific alternate frequency resources may communicate the PUSCH repetition to the base station such that the base station may determine the PUSCH repetition information based on the use of the alternate frequency resources for a PRACH transmission, instead of conveying the PUSCH repetition information via a certain data signaling. In some aspects, the alternate frequency resources may be at least partially different from the regular frequency resources for the PRACH transmission associated with the single PUSCH transmission.

In some aspects, the UE may determine the alternate frequency resources for the PRACH transmission and may transmit a PRACH message using the alternate frequency resources to communicate the PUSCH repetition information. Based on the PUSCH repetition information, the UE may transmit a PUSCH message and at least one repetition of the PUSCH message, thereby performing the PUSCH repetition.

As discussed above, the base station may determine the PUSCH repetition information based on the use of the alternate frequency resources for a PRACH transmission. In some aspects, when the base station determines the PUSCH repetition information, the base station may transmit an indication of PUSCH resources and/or a PUSCH parameter based on the PUSCH repetition information, such that the UE may use the PUSCH resources and/or the PUSCH parameter to transmit the PUSCH message and the at least one repetition of the PUSCH message. In some aspects, the indication of PUSCH resources and/or the PUSCH parameter may be transmitted via an RAR message.

In some aspects, the base station may indicate the alternate frequency resources to the UE. The base station may allocate the alternate frequency resources, e.g., by selecting available frequency resources that are different from the regular frequency resources. For example, the alternate frequency resources may be allocated in resource blocks. In an example, the alternate frequency resources may be in a different component carrier than the regular frequency resources for a PRACH transmission associated with a single PUSCH transmission without a PUSCH repetition. In some aspects, the base station may transmit a resource parameter indicating the alternate frequency resources to the UE, such that the UE may determine the alternate frequency resources based on the resource parameter received. In some aspects, the UE may receive the resource parameter via the system information from the base station. In some aspects, the UE may receive the resource parameter via system information (e.g., remaining minimum system information (RMSI)) transmitted from the base station.

In some aspects, the resource parameter may specifically indicate the alternate frequency resources. In some aspects, the resource parameter may include a frequency offset, where the UE may determine the alternate frequency resources by applying the frequency offset to the regular frequency resources for a PRACH transmission associated with a single PUSCH transmission without a PUSCH repetition. In some aspects, the frequency offset may be provided in a number of resource blocks.

In some aspects, the PUSCH repetition information may indicate one or more parameters corresponding to a request for a PUSCH repetition and/or an indication of a UE capability for the PUSCH repetition. In some aspects, the one or more parameters may include one or more of: the request for the PUSCH repetition, the indication of the UE capability, and a number of PUSCH repetitions. In some aspects, the one or more parameters may include an indication that the at least one of the request for the PUSCH repetition or the indication of the UE capability is associated with the PUSCH repetition with a DMRS aggregation for a cross-slot channel estimation. For example, when the DMRS aggregation/bundling is used, DMRSs on different repetitions in different slots may be used together for channel estimation, as the cross-slot channel estimation. In some aspects, the one or more parameters may include an indication that the PUSCH repetition is associated with one or more transmission configuration indicators (TCIs). For example, multiple TCIs may be associated with multiple beams of the UE. In some aspects, the one or more parameters may include an indication that the at least one of the request for the PUSCH repetition or the indication of the UE capability is associated with the PUSCH repetition with frequency hopping. For example, the frequency hopping may occur when a shift in frequency exists between PUSCH repetitions and thus different frequencies are used for different repetitions.

By utilizing different sets of alternate frequency resources, different parameters of the PUSCH repetition information may be communicated to the base station. For example, use of one set of alternate frequency resources may communicate one parameter, while a use of another set of alternate frequency resources may communicate another parameter. In some aspects, the one or more alternate frequency resources are different for each of the one or more parameters. In some aspects, a set of alternate frequency resources may be used to communicate multiple parameters, while a different set of alternate frequency resources may be used to communicate a single parameter. For example, a set of alternate frequency resources may be used to communicate the request for the PUSCH repetition and a number of PUSCH repetition, while another set of alternate frequency resources may be used to communicate the indication that the PUSCH repetition is associated with one or more TCIs. In an example, a set of alternate frequency resources may be used to communicate the request for the PUSCH repetition and a number of PUSCH repetition being two, while another set of alternate frequency resources may be used to communicate the request for the PUSCH repetition and a number of PUSCH repetition being four.

A transmit power for a PUSCH repetition may be different from a transmit power for a single PUSCH transmission without any PUSCH repetition. In some aspects, the UE may determine a transmit power parameter associated with a transmit power for a PUSCH repetition, and the UE configure the transmit power for the PUSCH repetition based on the transmit parameter. The alternate frequency resources may be associated with one transmit power parameter and the regular frequency resources for a PRACH transmission associated with a single PUSCH transmission without a PUSCH repetition may be associated with a different transmit parameter. Hence, in some aspects, the UE may determine a transmit power parameter for a PUSCH transmission to be the transmit power parameter associated with a transmit power for a PUSCH repetition when the UE determines to use the alternate frequency resources for the PRACH transmission. On the other hand, the UE may determine a transmit power parameter for a PUSCH transmission to be a transmit power parameter associated with a transmit power for a single PUSCH transmission without any PUSCH repetition when the UE determines to use the regular frequency resources for the PRACH transmission. Hence, determining to use the alternate frequency resources for the PRACH transmission may indicate which transmit power parameter to use for a PUSCH transmission and/or a PUSCH repetition.

In some aspects, the base station may determine the transmit power parameter associated with the transmit power for the PUSCH repetition from the base station and may further determine the transmit power parameter associated with the transmit power for the single PUSCH transmission without any PUSCH repetition. The UE may receive, from the base station, the transmit power parameter associated with the transmit power for the PUSCH repetition from the base station. The UE may also receive, from the base station, a different transmit power parameter associated with a transmit power associated with the transmit power for the single PUSCH transmission without any PUSCH repetition. The transmit power parameter(s) may be received from the base station via the system information (e.g., RMSI) from the base station. In some aspects, the transmit power parameter associated with the transmit power for the PUSCH repetition may include a power offset value between the transmit power for the PUSCH repetition and a second transmit power for the PRACH transmission. Further, the transmit power associated with the transmit power for the single PUSCH transmission may include a different power offset value between the transmit power for the single PUSCH transmission and the second transmit power for the PRACH transmission. For example, the second transmit power for the PRACH transmission may stay the same. In an example, to determine the transmit power for the PUSCH repetition, the power offset value between the transmit power for the PUSCH repetition and the second transmit power for the PRACH transmission may be applied to the second transmit power. In an example, the power offset value may be based on a power parameter "msg3-DeltaPreamble" included in a PUSCH-ConfigCommon field communicated from the base station. In another example, the power parameters may include one or more of the parameters "msg3-Alpha" and "p0-NominalWithoutGrant" and "p0-PUSCH-Alpha" in a PUSCH-PowerControl field transmitted from the base station.

In some aspects, the transmit power parameter associated with the transmit power for the PUSCH repetition from the base station and/or the transmit power parameter associated with the transmit power for the single PUSCH transmission without any PUSCH repetition may be preloaded in the UE.

In some aspects, transmit power parameter includes a power offset value between the transmit power for the PUSCH repetition and a second transmit power for the PRACH transmission.

As indicated above, FIG. 3 is provided as an example. Other examples may differ from what is described with regard to FIG. 3.

Figure 4:
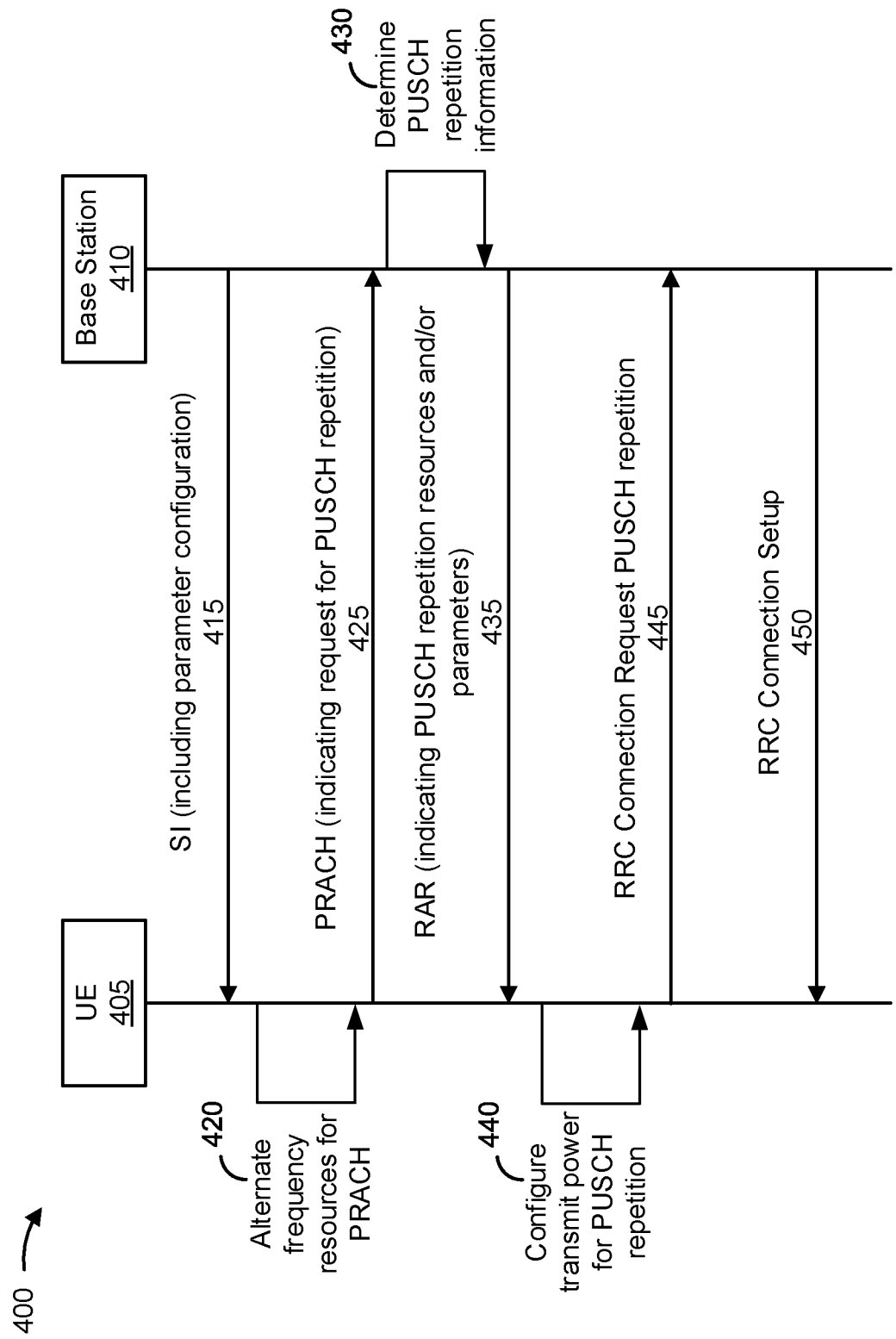
FIG. 4 is a diagram illustrating an example associated with requests for physical uplink shared channel (PUSCH) repetition associated with a radio resource control (RRC) connection request message in a RACH procedure, in accordance with the present disclosure.

FIG. 4 is a diagram illustrating an example 400 associated with requests for PUSCH repetition associated with an RRC connection request message in a RACH procedure, in accordance with the present disclosure. As shown in FIG. 4, a UE 405 and a base station 410 may communicate with one another.

As shown by reference number 415, the base station 410 may transmit, and the UE 405 may receive, system information (SI) that may include a parameter configuration that indicates a relationship between one or more PRACH parameters and a request for PUSCH repetitions associated with an RRC connection request message. In some aspects, the parameter configuration may indicate a relationship between one or more PRACH parameters and one or more requested parameters corresponding to a requested PUSCH repetition. The SI may include, for example, RMSI. In some aspects, the relationships described above, or aspects, thereof, may be indicated by a wireless communication standard.

As used herein, "repetition" refers to a communication that is transmitted more than one time and refers to the initial transmission of that communication or any subsequent retransmission of that communication. PUSCH repetition (which may be referred to, for example, as slot-repetition, slot-aggregation, and/or multi-slot PUSCH) may be used to increase a signal-to-noise ratio (SNR) to improve transmission reliability.

As shown by reference number 420, the UE 405 may determine to utilize alternate frequency resources for a PRACH transmission, where a use of the alternate frequency resources communicates a PUSCH repetition information. Hence, by utilizing the alternate frequency resources for the PRACH transmission, the UE 405 may indicate the PUSCH repetition information to the base station 410. The alternate frequency resources may be different from the regular frequency resources for a PRACH transmission associated with a single PUSCH transmission without a PUSCH repetition. The alternate frequency resources may be determined based on a resource parameter indicating the alternate frequency resources, where the resource parameter may be preconfigured/preloaded at the UE 405 or may be provided by the base station 410 (e.g., via the SI).

As shown by reference number 425, the UE 405 may transmit, and the base station 410 may receive, a PRACH message that includes a request for PUSCH repetition associated with an RRC connection request message of the RACH procedure. In some aspects, the UE 405 may transmit, and the base station 410 may receive, the PRACH message using the alternate frequency resources to communicate the PUSCH repetition information. The request for PUSCH repetition may indicate one or more suggested parameters corresponding to the PUSCH repetition. For example, the one or more suggested parameters may indicate a number of PUSCH repetitions. In some aspects, the request for PUSCH repetition may indicate a request for an aggregated demodulation reference signal for cross-slot channel estimation. The request for PUSCH repetition may include a request for PUSCH repetition associated with one or more transmission configuration indicators and/or a request for PUSCH repetition with frequency hopping, among other examples. As discussed above, the PUSCH repetition information may indicate one or more parameters corresponding to a request for a PUSCH repetition and/or an indication of a UE capability for the PUSCH repetition. Hence, the UE 405 may implicitly communicate the PUSCH repetition information by using the alternate frequency resources to transmit the PRACH message.

In some aspects, the UE 405 may repeat the PRACH message over a plurality of RACH occasions (ROs). In some aspects, the request for PUSCH repetition may be implicit. For example, the UE 405 may transmit a PRACH preamble that is selected from a subset of PRACH preambles of a set of PRACH preambles. The subset may indicate the request for PUSCH repetition. In some aspects, the UE 405 may transmit the PRACH message using a subset of ROs of a set of ROs, where the subset of ROs indicates the request for PUSCH repetition. In some aspects, the UE 405 may transmit the PRACH message using a PRACH format that indicates the request for PUSCH repetition.

In some aspects, the UE 405 may transmit the PRACH message based at least in part on one or more PRACH parameters. In some aspects, the PRACH message may be transmitted based at least in part on the parameter configuration received from the base station 410. The UE 405 may select the one or more PRACH parameters based at least in part on a relationship between the one or more PRACH parameters and one or more request parameters corresponding to the request for PUSCH repetition. As indicated above, the relationship may be indicated by the base station and/or specified in a wireless communication standard.

The UE 405 may be configured to determine that one or more trigger criteria are satisfied and to transmit the request for PUSCH repetition based at least in part on determining that the one or more trigger criteria are satisfied. In some aspects, the base station 410 may transmit, and the UE 405 may receive, a trigger configuration that indicates the one or more trigger criteria. The trigger configuration may be carried in SI (e.g., RMSI).

In some aspects, for example, the one or more trigger criteria may include one or more thresholds. For example, the one or more trigger criteria may include a first RSRP threshold. The UE 405 may determine a first SSB based RSRP and may determine that the first SSB based RSRP satisfies the first RSRP threshold. The UE 405 may request the PUSCH repetition based at least in part on determining that the first SSB based RSRP satisfies the first RSRP threshold.

In some aspects, the one or more trigger criteria may include a second RSRP threshold. The UE 405 may determine a second SSB based RSRP and may determine that the second SSB based RSRP satisfies the second RSRP threshold. In some aspects, for example, the request for PUSCH repetition may indicate a first number of requested PUSCH repetitions based at least in part on determining that the first SSB based RSRP satisfies the first RSRP threshold and may indicate a second number of requested PUSCH repetitions based at least in part on determining that the second SSB based RSRP satisfies the second RSRP threshold. In some aspects, the one or more trigger criteria may be indicated in a wireless communication standard.

As shown by reference number 430, when the base station 410 determines that the alternate frequency resources are used to receive receives the PRACH message, the base station 410 may determine the PUSCH repetition information based on the alternate frequency resources.

As shown by reference number 435, the base station 410 may transmit, and the UE 405 may receive, an RAR message. The RAR message may be transmitted by the base station 410, and received by the UE 405, based on the PUSCH repetition information. The RAR message may indicate at least one of a PUSCH resource for the RRC connection request message, or a PUSCH parameter associated with the RRC connection request message. The UE 405 may, for example, determine, based at least in part on the RAR message, at least one of a PUSCH repetition parameter or a PUSCH repetition resource.

In some aspects, the base station 410 may transmit, and the UE 405 may receive, an indication of a PUSCH repetition request grant. The PUSCH repetition request grant may correspond to at least a portion of the PUSCH repetition request. In some aspects, the indication of the PUSCH repetition request grant may be carried in the RAR message. For example, the indication of the PUSCH repetition request grant may be carried in a PDCCH portion of the RAR message.

As shown by reference number 440, the UE 405 may determine a transmit power parameter associated with a transmit power for the PUSCH repetition and configure the transmit power for the PUSCH repetition based on the transmit parameter. The transmit power parameter may be determined based on the alternate frequency resources. The transmit power parameter may be preconfigured/preloaded at the UE 405 or may be provided by the base station 410 (e.g., via the SI).

As shown by reference number 445, the UE 405 may transmit, and the base station 410 may receive, an RRC connection request PUSCH repetition. The RRC connection request PUSCH repetition may be transmitted based at least in part on resources and/or parameters indicated in the RAR, which may be based at least in part on the request for PUSCH repetition. In some aspects, the resources and/or parameters indicated in the RAR may be based at least in part on the PUSCH repetition information. In some aspects, any number of additional RRC connection request PUSCH repetitions may be transmitted. As shown by reference number 450, the base station 410 may transmit, and the UE 405 may receive, an RRC connection setup message. The base station 410 may transmit the RRC connection setup message in response to receiving one or more of the PUSCH repetitions.

As indicated above, FIG. 4 is provided as an example. Other examples may differ from what is described with respect to FIG. 4.

Figure 5:
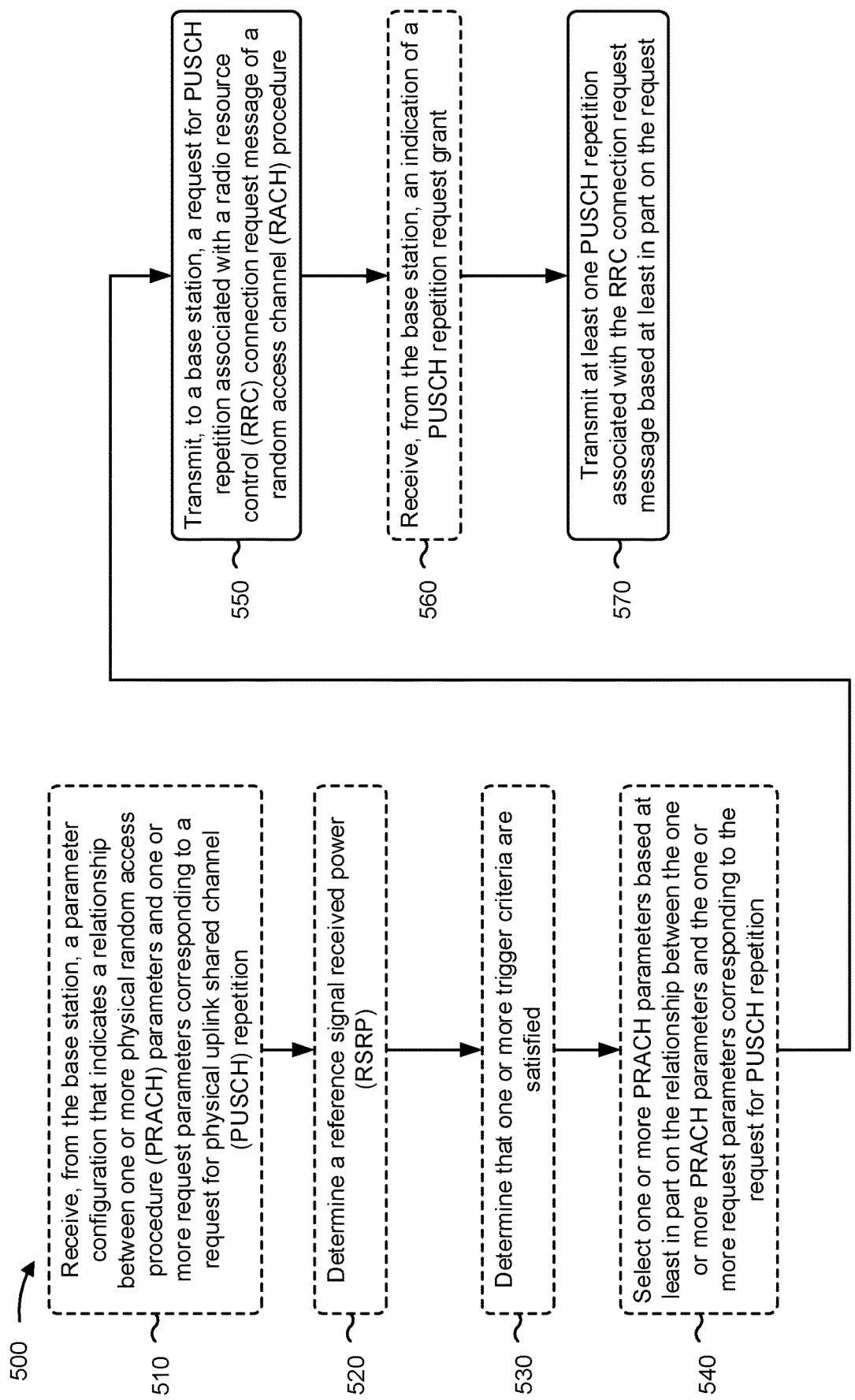
FIGS. 5-8 are diagrams illustrating example processes associated with requests for PUSCH repetition associated with an RRC connection request message in a RACH procedure, in accordance with the present disclosure.

FIG. 5 is a diagram illustrating an example process 500 performed, for example, by a UE, in accordance with the present disclosure. Example process 500 is an example where the UE (e.g., UE 405) performs operations associated with requests for PUSCH repetition associated with an RRC connection request message in a RACH procedure.

As shown in FIG. 5, in some aspects, process 500 may include receiving, from a base station, a parameter configuration that indicates a relationship between one or more PRACH parameters and one or more request parameters corresponding to a request for PUSCH repetition (block 510). For example, the UE (e.g., using reception component 902, depicted in FIG. 9) may receive, from a base station, a parameter configuration that indicates a relationship between one or more PRACH parameters and one or more request parameters corresponding to a request for PUSCH repetition. In some aspects, the parameter configuration is carried in SI. In some aspects, the SI comprises RMSI. In some aspects, the relationship is indicated by a wireless communication standard.

As shown in FIG. 5, in some aspects, process 500 may include determining an RSRP (block 520). For example, the UE (e.g., using determination component 908, depicted in FIG. 9) may determine an RSRP. In some aspects, the RSRP may be an SSB based RSRP. As shown in FIG. 5, in some aspects, process 500 may include determining that one or more trigger criteria are satisfied (block 530). For example, the UE (e.g., using determination component 908, depicted in FIG. 9) may determine that one or more trigger criteria are satisfied. In some aspects, process 500 includes receiving, from the base station, a trigger configuration that indicates the one or more trigger criteria. In some aspects, the one or more trigger criteria are indicated in a wireless communication standard.

In some aspects, the trigger configuration is carried in SI. In some aspects, the SI comprises RMSI. In some aspects, the one or more trigger criteria comprise a first RSRP threshold. In some aspects, process 500 includes determining a first SSB based RSRP, wherein determining that the one or more trigger criteria are satisfied comprises determining that the first SSB based RSRP satisfies the first RSRP threshold. In some aspects, the one or more trigger criteria comprise a second RSRP threshold. In some aspects, process 500 includes determining a second SSB based RSRP, wherein determining that the one or more trigger criteria are satisfied comprises determining that the second SSB based RSRP satisfies the second RSRP threshold.

As shown in FIG. 5, in some aspects, process 500 may include selecting one or more PRACH parameters based at least in part on the relationship between the one or more PRACH parameters and the one or more request parameters corresponding to the request for PUSCH repetition (block 540). For example, the UE (e.g., using determination component 908, depicted in FIG. 9) may select one or more PRACH parameters based at least in part on the relationship between the one or more PRACH parameters and the one or more request parameters corresponding to the request for PUSCH repetition.

As shown in FIG. 5, in some aspects, process 500 may include transmitting, to a base station, a request for PUSCH repetition associated with an RRC connection request message of a RACH procedure (block 550). For example, the UE (e.g., using transmission component 904, depicted in FIG. 9) may transmit, to a base station, a request for PUSCH repetition associated with an RRC connection request message of a RACH procedure, as described above. In some aspects, transmitting the request for PUSCH repetition comprises transmitting the request for PUSCH repetition based at least in part on determining that the one or more trigger criteria are satisfied. For example, in some aspects, the request for PUSCH repetition indicates a first number of requested PUSCH repetitions based at least in part on determining that the first SSB based RSRP satisfies the first RSRP threshold, and the request for PUSCH repetition indicates a second number of requested PUSCH repetitions based at least in part on determining that the second SSB based RSRP satisfies the second RSRP threshold.

In some aspects, the request for PUSCH repetition indicates one or more suggested parameters corresponding to the PUSCH repetition. In some aspects, the one or more suggested parameters indicates a number of PUSCH repetitions. In some aspects, the request for PUSCH repetition indicates a request for an aggregated demodulation reference signal for cross-slot channel estimation. In some aspects, the request for PUSCH repetition comprises a request for PUSCH repetition associated with one or more transmission configuration indicators. In some aspects, the request for PUSCH repetition comprises a request for PUSCH repetition with frequency hopping.

In some aspects, transmitting the request for PUSCH repetition comprises transmitting a PRACH message that indicates the request for PUSCH repetition. In some aspects, transmitting the request for PUSCH repetition comprises repeating the PRACH message over a plurality of RACH occasions. In some aspects, transmitting the request for PUSCH repetition comprises transmitting a PRACH preamble that is selected from a subset of PRACH preambles of a set of PRACH preambles, wherein the subset indicates the request for PUSCH repetition. In some aspects, transmitting the request for PUSCH repetition comprises transmitting the PRACH message using a subset of ROs of a set of ROs, wherein the subset of ROs indicates the request for PUSCH repetition. In some aspects, transmitting the request for PUSCH repetition comprises transmitting the PRACH message using a PRACH format that indicates the request for PUSCH repetition. In some aspects, transmitting the PRACH message comprises transmitting the PRACH message based at least in part on one or more PRACH parameters.

As shown in FIG. 5, in some aspects, process 500 may include receiving, from the base station, an indication of a PUSCH repetition request grant, wherein the PUSCH repetition request grant corresponds to at least a portion of the PUSCH repetition request (block 560). For example, the UE (e.g., using reception component 902, depicted in FIG. 9) may receive, from the base station, an indication of a PUSCH repetition request grant, wherein the PUSCH repetition request grant corresponds to at least a portion of the PUSCH repetition request. In some aspects, the indication of the PUSCH repetition request grant is carried in an RAR message. In some aspects, the indication of the PUSCH repetition request grant is carried in a physical downlink control channel portion of the RAR message.

In some aspects, process 500 includes receiving, from the base station, an RAR message, wherein the RAR message indicates at least one of a PUSCH resource for the RRC connection request message, or a PUSCH parameter associated with the RRC connection request message, and determining, based at least in part on the RAR message, at least one of a PUSCH repetition parameter or a PUSCH repetition resource. In some aspects, determining the at least one of the PUSCH repetition parameter or the PUSCH repetition resource comprises determining the at least one of the PUSCH repetition parameter or the PUSCH repetition resource based at least in part on one or more rules indicated by a wireless communication standard.

As further shown in FIG. 5, in some aspects, process 500 may include transmitting at least one PUSCH repetition associated with the RRC connection request message based at least in part on the request (block 570). For example, the UE (e.g., using transmission component 904, depicted in FIG. 9) may transmit at least one PUSCH repetition associated with the RRC connection request message based at least in part on the request, as described above. In some aspects, transmitting the at least one PUSCH repetition comprises transmitting the at least one PUSCH repetition based at least in part on transmitting the request for PUSCH repetition.

Process 500 may include additional aspects, such as any single aspect or any combination of aspects described above and/or in connection with one or more other processes described elsewhere herein. Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
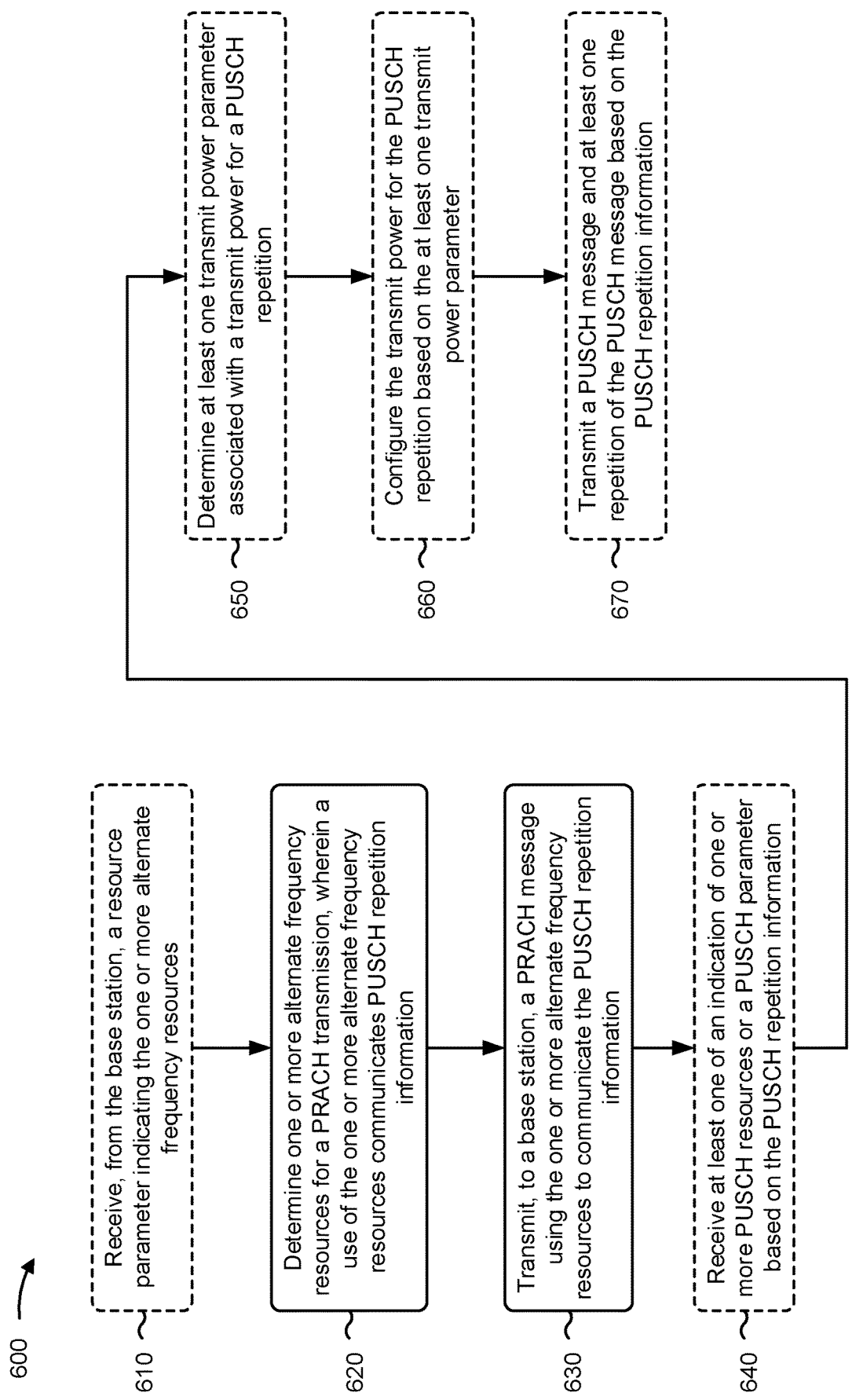

FIG. 6 is a diagram illustrating an example process 600 performed, for example, by a UE, in accordance with the present disclosure. Example process 600 is an example where the UE (e.g., UE 405) performs operations associated with requests for PUSCH repetition associated with an RRC connection request message in a RACH procedure.

As shown in FIG. 6, in some aspects, process 600 may include receiving, from the base station, a resource parameter indicating the one or more alternate frequency resources (block 610). For example, the UE (e.g., using reception component 902, depicted in FIG. 9) may receive, from the base station, a resource parameter indicating the one or more alternate frequency resources, as described above. In some aspects, the resource parameter is received via SI. In some aspects, the SI includes RMSI. In some aspects, the resource parameter includes a frequency offset.

As shown in FIG. 6, in some aspects, process 600 may include determining one or more alternate frequency resources for a PRACH transmission, wherein a use of the one or more alternate frequency resources communicates PUSCH repetition information (block 620). For example, the UE (e.g., using determination component 908, depicted in FIG. 9) may determine one or more alternate frequency resources for a PRACH transmission, wherein a use of the one or more alternate frequency resources communicates PUSCH repetition information, as described above.

In some aspects, the one or more alternate frequency resources are different from one or more frequency resources for a PRACH transmission associated with a single PUSCH transmission without a PUSCH repetition. In some aspects, the one or more alternative frequency resources are determined based on the resource parameter. In some aspects, determining the one or more alternate frequency resources comprises determining the one or more alternate frequency resources by applying the frequency offset to one or more frequency resources for a PRACH transmission associated with a single PUSCH transmission without a PUSCH repetition.

As further shown in FIG. 6, in some aspects, process 600 may include transmitting, to a base station, a PRACH message using the one or more alternate frequency resources to communicate the PUSCH repetition information (block 630). For example, the UE (e.g., using transmission component 904, depicted in FIG. 9) may transmit, to a base station, a PRACH message using the one or more alternate frequency resources to communicate the PUSCH repetition information, as described above.

In some aspects, the PUSCH repetition information indicates one or more parameters corresponding to at least one of a request for a PUSCH repetition or an indication of a UE capability for the PUSCH repetition. In some aspects, the one or more parameters include at least one of the request for the PUSCH repetition, the indication of the UE capability, a number of PUSCH repetitions, an indication that the at least one of the request for the PUSCH repetition or the indication of the UE capability is associated with the PUSCH repetition with a DMRS aggregation for a cross-slot channel estimation, an indication that the PUSCH repetition is associated with one or more TCIs, or an indication that the at least one of the request for the PUSCH repetition or the indication of the UE capability is associated with the PUSCH repetition with frequency hopping. In some aspects, the one or more alternate frequency resources are different for each of the one or more parameters.

As further shown in FIG. 6, in some aspects, process 600 may include receiving at least one of an indication of one or more PUSCH resources or a PUSCH parameter based on the PUSCH repetition information (block 640). For example, the UE (e.g., using reception component 902, depicted in FIG. 9) may receive at least one of an indication of one or more PUSCH resources or a PUSCH parameter based on the PUSCH repetition information, as described above.

As further shown in FIG. 6, in some aspects, process 600 may include determining at least one transmit power parameter associated with a transmit power for a PUSCH repetition (block 650). For example, the UE (e.g., using determination component 908, depicted in FIG. 9) may determine at least one transmit power parameter associated with a transmit power for a PUSCH repetition, as described above. As further shown in FIG. 6, in some aspects, process 600 may include configuring the transmit power for the PUSCH repetition based on the at least one transmit power parameter (block 660). For example, the UE (e.g., using transmission component 904, depicted in FIG. 9) may configure the transmit power for the PUSCH repetition based on the at least one transmit power parameter, as described above.

In some aspects, the at least one transmit power parameter is determined based on the one or more alternate frequency resources determined for the PRACH transmission. In some aspects, the determining the at least one transmit power parameter comprises receiving the at least one transmit power parameter from the base station. In some aspects, the at least one transmit power parameter includes a power offset value between the transmit power for the PUSCH repetition and a second transmit power for the PRACH transmission.

As further shown in FIG. 6, in some aspects, process 600 may include transmitting a PUSCH message and at least one repetition of the PUSCH message based on the PUSCH repetition information (block 670). For example, the UE (e.g., using transmission component 904, depicted in FIG. 9) may transmit a PUSCH message and at least one repetition of the PUSCH message based on the PUSCH repetition information, as described above. In some aspects, the PUSCH message and the at least one repetition of the PUSCH message is transmitted using at least one of the one or more PUSCH resources or the PUSCH parameter.

Process 600 may include additional aspects, such as any single aspect or any combination of aspects described below and/or in connection with one or more other processes described elsewhere herein. Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
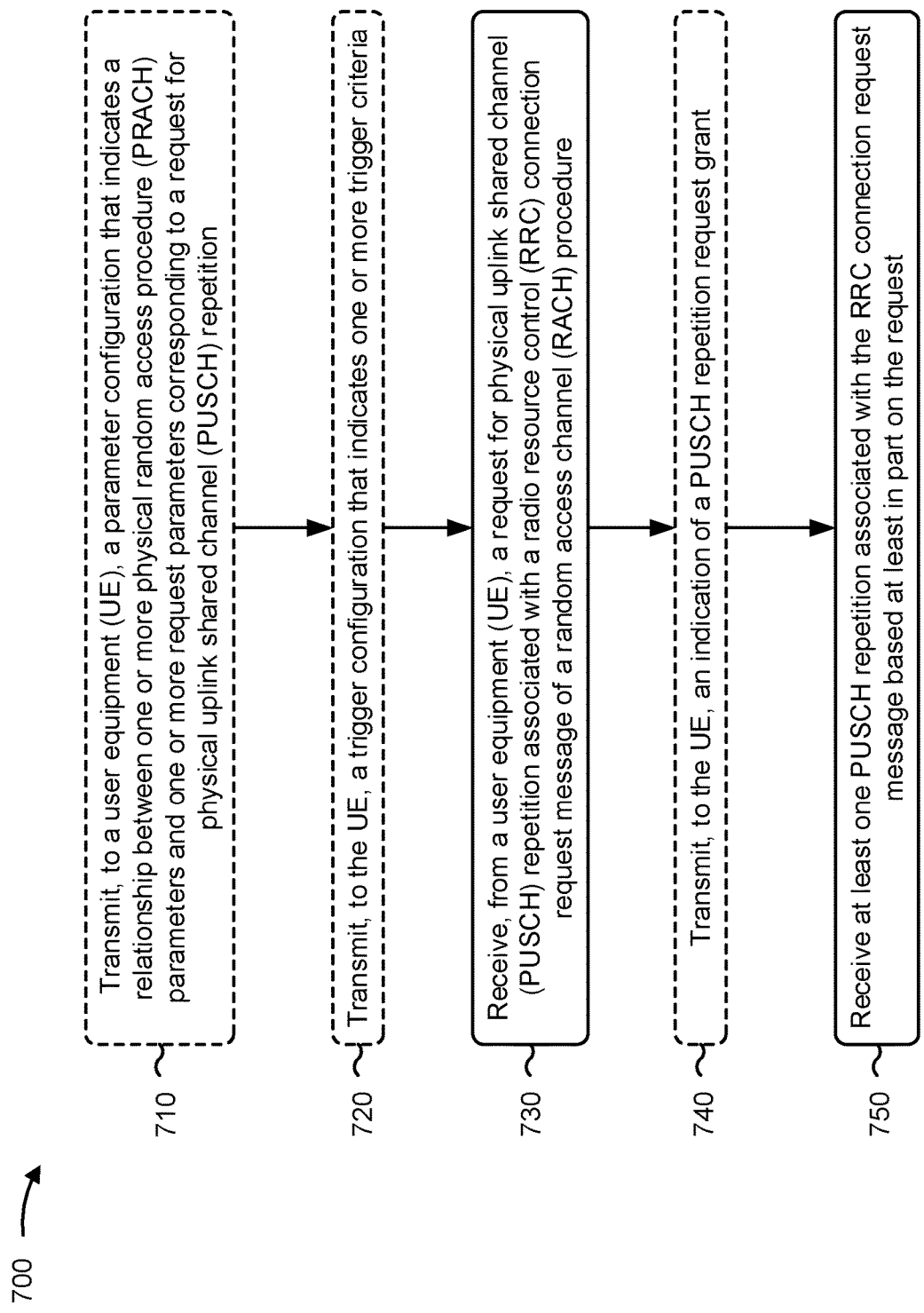

FIG. 7 is a diagram illustrating an example process 700 performed, for example, by a base station, in accordance with the present disclosure. Example process 700 is an example where the base station (e.g., base station 410) performs operations associated with requests for PUSCH repetition associated with an RRC connection request message in a RACH procedure.

As shown in FIG. 7, in some aspects, process 700 may include transmitting, to the UE, a parameter configuration that indicates a relationship between one or more PRACH parameters and one or more request parameters corresponding to a request for PUSCH repetition (block 710). For example, the base station (e.g., using transmission component 1104, depicted in FIG. 11) may transmit, to the UE, a parameter configuration that indicates a relationship between one or more PRACH parameters and one or more request parameters corresponding to a request for PUSCH repetition, as described above. In some aspects, the parameter configuration is carried in SI. In some aspects, the SI comprises RMSI. In some aspects, the relationship is indicated by a wireless communication standard.

As shown in FIG. 7, in some aspects, process 700 may include transmitting, to the UE, a trigger configuration that indicates the one or more trigger criteria (block 720). For example, the base station (e.g., using transmission component 1104, depicted in FIG. 11) may transmit, to the UE, a trigger configuration that indicates the one or more trigger criteria, as described above. In some aspects, the trigger configuration is carried in SI. In some aspects, the SI comprises RMSI. In some aspects, the one or more trigger criteria comprise a first RSRP threshold. In some aspects, the one or more trigger criteria are indicated in a wireless communication standard.

As shown in FIG. 7, in some aspects, process 700 may include receiving, from a UE, a request for PUSCH repetition associated with an RRC connection request message of a RACH procedure (block 730). For example, the base station (e.g., using reception component 1102, depicted in FIG. 11) may receive, from a UE, a request for PUSCH repetition associated with an RRC connection request message of a RACH procedure, as described above.

In some aspects, the request for PUSCH repetition indicates one or more suggested parameters corresponding to the PUSCH repetition. In some aspects, the one or more suggested parameters indicates a number of PUSCH repetitions. In some aspects, the request for PUSCH repetition indicates a request for an aggregated demodulation reference signal for cross-slot channel estimation. In some aspects, the request for PUSCH repetition comprises a request for PUSCH repetition associated with one or more transmission configuration indicators. In some aspects, the request for PUSCH repetition comprises a request for PUSCH repetition with frequency hopping.

In some aspects, receiving the request for PUSCH repetition comprises receiving a PRACH message that indicates the request for PUSCH repetition. In some aspects, receiving the request for PUSCH repetition comprises receiving a repeated PRACH message over a plurality of RACH occasions. In some aspects, receiving the request for PUSCH repetition comprises receiving a PRACH preamble that is selected from a subset of PRACH preambles of a set of PRACH preambles, wherein the subset indicates the request for PUSCH repetition. In some aspects, receiving the request for PUSCH repetition comprises receiving the PRACH message using a subset of ROs of a set of ROs, wherein the subset of ROs indicates the request for PUSCH repetition.

In some aspects, receiving the request for PUSCH repetition comprises receiving the PRACH message using a PRACH format that indicates the request for PUSCH repetition. In some aspects, receiving the PRACH message comprises receiving the PRACH message based at least in part on one or more PRACH parameters. In some aspects, a selection of the one or more PRACH parameters is based at least in part on the relationship between the one or more PRACH parameters and the one or more request parameters corresponding to the request for PUSCH repetition.

As shown in FIG. 7, in some aspects, process 700 may include transmitting, to the UE, an indication of a PUSCH repetition request grant, wherein the PUSCH repetition request grant corresponds to at least a portion of the PUSCH repetition request (block 740). For example, the base station (e.g., using transmission component 1104, depicted in FIG. 11) may transmit, to the UE, an indication of a PUSCH repetition request grant, wherein the PUSCH repetition request grant corresponds to at least a portion of the PUSCH repetition request, as described above. In some aspects, the indication of the PUSCH repetition request grant is carried in a RAR message. In some aspects, the indication of the PUSCH repetition request grant is carried in a PDCCH portion of the RAR message.

In some aspects, process 800 includes transmitting, to the UE, RAR message, wherein the RAR message indicates at least one of a PUSCH resource for the RRC connection request message, or a PUSCH parameter associated with the RRC connection request message. In some aspects, a determination of the at least one of the PUSCH repetition parameter or the PUSCH repetition resource comprises a determination of the at least one of the PUSCH repetition parameter or the PUSCH repetition resource based at least in part on one or more rules indicated by a wireless communication standard.

As further shown in FIG. 7, in some aspects, process 700 may include receiving at least one PUSCH repetition associated with the RRC connection request message based at least in part on the request (block 750). For example, the base station (e.g., using reception component 1102, depicted in FIG. 11) may receive at least one PUSCH repetition associated with the RRC connection request message based at least in part on the request, as described above. In some aspects, receiving the at least one PUSCH repetition comprises receiving the at least one PUSCH repetition based at least in part on the request for PUSCH repetition.

In some aspects, receiving the request for PUSCH repetition comprises receiving the request for PUSCH repetition based at least in part on a determination that one or more trigger criteria are satisfied. In some aspects, a determination that the one or more trigger criteria are satisfied comprises a determination that a first SSB based RSRP satisfies the first RSRP threshold. In some aspects, the one or more trigger criteria comprise a second RSRP threshold. In some aspects, a determination that the one or more trigger criteria are satisfied comprises a determination that a second SSB based RSRP satisfies the second RSRP threshold. In some aspects, the request for PUSCH repetition indicates a first number of requested PUSCH repetitions based at least in part on the determination that the first SSB based RSRP satisfies the first RSRP threshold, and the request for PUSCH repetition indicates a second number of requested PUSCH repetitions based at least in part on the determination that the second SSB based RSRP satisfies the second RSRP threshold.

Process 700 may include additional aspects, such as any single aspect or any combination of aspects described below and/or in connection with one or more other processes described elsewhere herein. Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
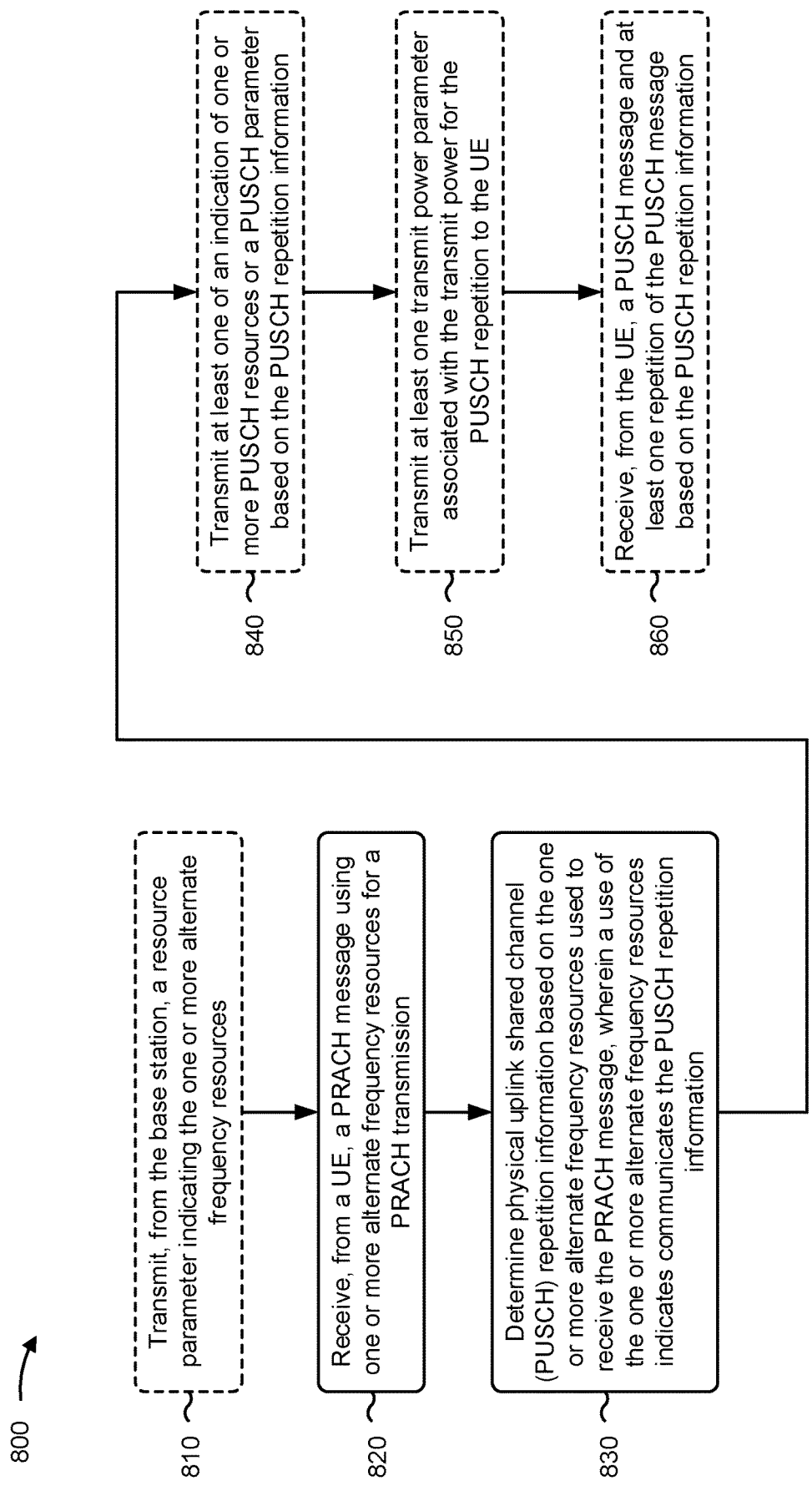

FIG. 8 is a diagram illustrating an example process 800 performed, for example, by a base station, in accordance with the present disclosure. Example process 800 is an example where the base station (e.g., base station 410) performs operations associated with requests for PUSCH repetition associated with an RRC connection request message in a RACH procedure.

As shown in FIG. 8, in some aspects, process 800 may include transmitting, from the base station, a resource parameter indicating the one or more alternate frequency resources (block 810). For example, the base station (e.g., using transmission component 1104, depicted in FIG. 11) may transmit, from the base station, a resource parameter indicating the one or more alternate frequency resources, as described above. In some aspects, the resource parameter is transmitted via SI. In some aspects, the SI includes RMSI. In some aspects, the resource parameter includes a frequency offset.

As shown in FIG. 8, in some aspects, process 800 may include receiving, from a UE, a PRACH message using one or more alternate frequency resources for a PRACH transmission (block 820). For example, the base station (e.g., using reception component 1102, depicted in FIG. 11) may receive, from a UE, a PRACH message using one or more alternate frequency resources for a PRACH transmission, as described above. In some aspects, the one or more alternative frequency resources are determined based on the resource parameter. In some aspects, the one or more alternate frequency resources are different from one or more frequency resources for a PRACH transmission associated with a single PUSCH transmission without a PUSCH repetition. In some aspects, the one or more alternative frequency resources are determined by applying the frequency offset to one or more frequency resources for a PRACH transmission associated with a single PUSCH transmission without a PUSCH repetition.

As further shown in FIG. 8, in some aspects, process 800 may include determining PUSCH repetition information based on the one or more alternate frequency resources used to receive the PRACH message, wherein a use of the one or more alternate frequency resources communicates the PUSCH repetition information (block 830). For example, the base station (e.g., using determination component 1108, depicted in FIG. 11) may determine PUSCH repetition information based on the one or more alternate frequency resources used to receive the PRACH message, wherein a use of the one or more alternate frequency resources communicates the PUSCH repetition information, as described above.

In some aspects, the PUSCH repetition information indicates one or more parameters corresponding to at least one of a request for a PUSCH repetition or an indication of a UE capability for the PUSCH repetition. In some aspects, the one or more parameters include at least one of the request for the PUSCH repetition, the indication of the UE capability, a number of PUSCH repetitions, an indication that the at least one of the request for the PUSCH repetition or the indication of the UE capability is associated with the PUSCH repetition with a DMRS aggregation for a cross-slot channel estimation, an indication that the PUSCH repetition is associated with one or more TCIs, or an indication that the at least one of the request for the PUSCH repetition or the indication of the UE capability is associated with the PUSCH repetition with frequency hopping. In some aspects, the one or more alternate frequency resources are different for each of the one or more parameters.

As further shown in FIG. 8, in some aspects, process 800 may include transmitting at least one of an indication of one or more PUSCH resources or a PUSCH parameter based on the PUSCH repetition information (block 840). For example, the base station (e.g., using transmission component 1104, depicted in FIG. 11) may transmit at least one of an indication of one or more PUSCH resources or a PUSCH parameter based on the PUSCH repetition information, as described above.

As further shown in FIG. 8, in some aspects, process 800 may include transmitting at least one transmit power parameter associated with a transmit power for a PUSCH repetition to the UE (block 850). For example, the base station (e.g., using transmission component 1104, depicted in FIG. 11) may transmit at least one transmit power parameter associated with a transmit power for a PUSCH repetition to the UE, as described above.

In some aspects, the at least one transmit power parameter includes a power offset value between the transmit power for the PUSCH repetition and a second transmit power for the PRACH transmission. In some aspects, a transmit power for a PUSCH repetition is configured based on at least one transmit power parameter associated with the transmit power. In some aspects, the at least one transmit power parameter is determined based on the one or more alternate frequency resources determined for the PRACH transmission.

As further shown in FIG. 8, in some aspects, process 800 may include receiving, from the UE, a PUSCH message and at least one repetition of the PUSCH message based on the PUSCH repetition information (block 860). For example, the base station (e.g., using reception component 1102, depicted in FIG. 11) may receive, from the UE, a PUSCH message and at least one repetition of the PUSCH message based on the PUSCH repetition information, as described above. In some aspects, the PUSCH message and the at least one repetition of the PUSCH message is received using at least one of the one or more PUSCH resources or the PUSCH parameter.

Process 800 may include additional aspects, such as any single aspect or any combination of aspects described below and/or in connection with one or more other processes described elsewhere herein. Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
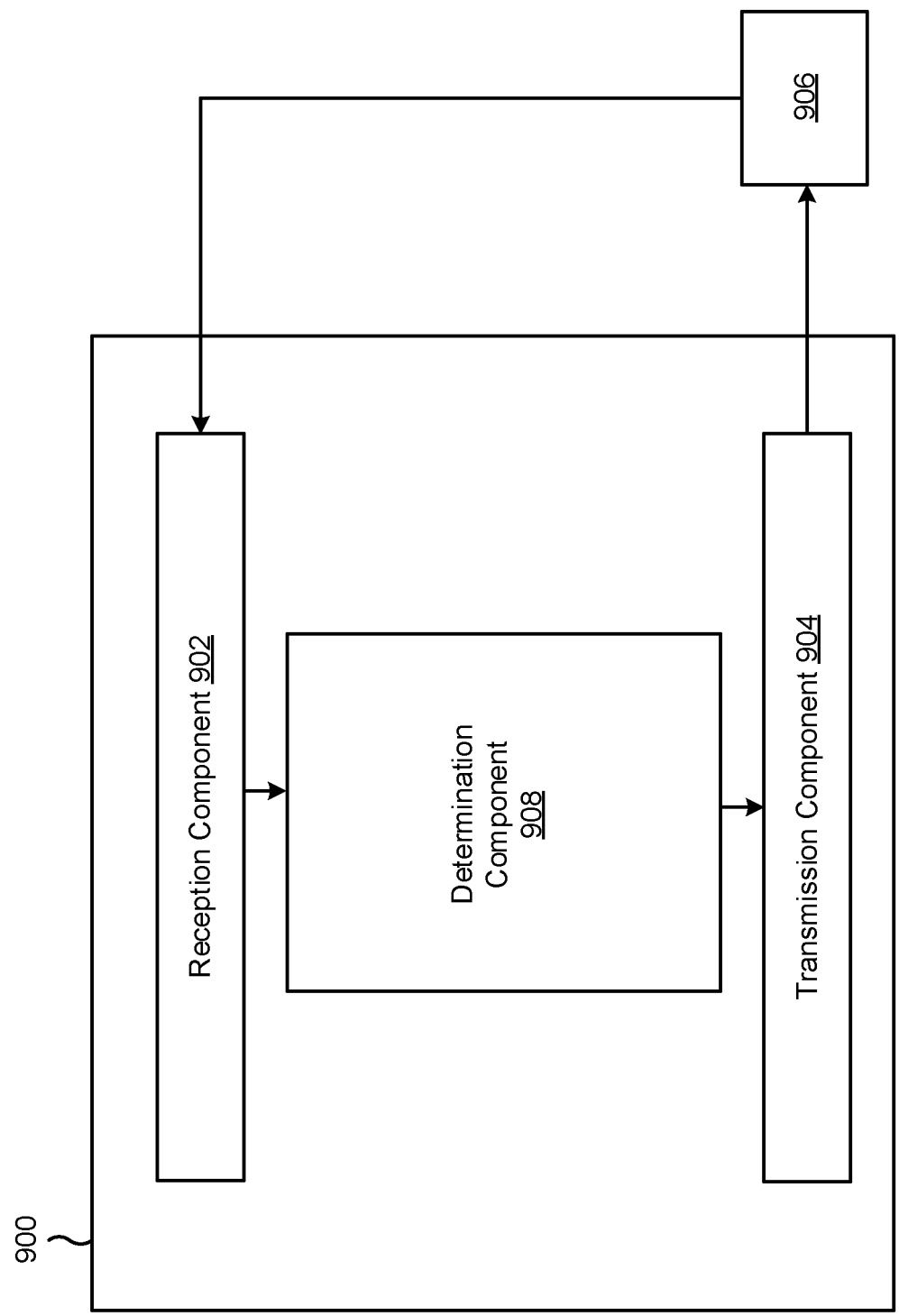
FIGS. 9-12 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908.

In some aspects, the apparatus 900 may be configured to perform one or more operations described herein in connection with FIG. 4. Additionally, or alternatively, the apparatus 900 may be configured to perform one or more processes described herein, such as process 500 of FIG. 5, process 600 of FIG. 6, or some combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digitalto-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The determination component 908 may determine one or more alternate frequency resources for a PRACH transmission, wherein a use of the one or more alternate frequency resources communicates PUSCH repetition information. In some aspects, the determination component 908 may include one or more antennas, a modulator, a transmit MIMO processor, a transmit processor, a demodulator, a MIMO detector, a receive processor, a controller/processor, a memory, or a combination thereof, of the UE described above in connection with FIG. 2. In some aspects, the determination component 908 may include the reception component 902 and/or the transmission component 904.

The transmission component 904 may transmit, to a base station, a PRACH message using the one or more alternate frequency resources to communicate the PUSCH repetition information. The reception component 902 may receive, from the base station, a resource parameter indicating the one or more alternate frequency resources wherein the one or more alternative frequency resources are determined based on the resource parameter.

The determination component 908 may be configured to determine that one or more trigger criteria are satisfied, triggering a PUSCH repetition request. The determination component 908 may determine at least one transmit power parameter associated with a transmit power for a PUSCH repetition. The transmission component 904 may configure the transmit power for the PUSCH repetition based on the at least one transmit power parameter. The reception component 902 may receive at least one of an indication of one or more PUSCH resources or a PUSCH parameter based on the PUSCH repetition information wherein the PUSCH message and the at least one repetition of the PUSCH message is transmitted using at least one of the one or more PUSCH resources or the PUSCH parameter.

The transmission component 904 may transmit, to a base station, a request for PUSCH repetition associated with an RRC connection request message of a RACH procedure. The transmission component 904 may transmit at least one PUSCH repetition associated with the RRC connection request message based at least in part on the request. The transmission component 904 may transmit a PUSCH message and at least one repetition of the PUSCH message based on the PUSCH repetition information The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
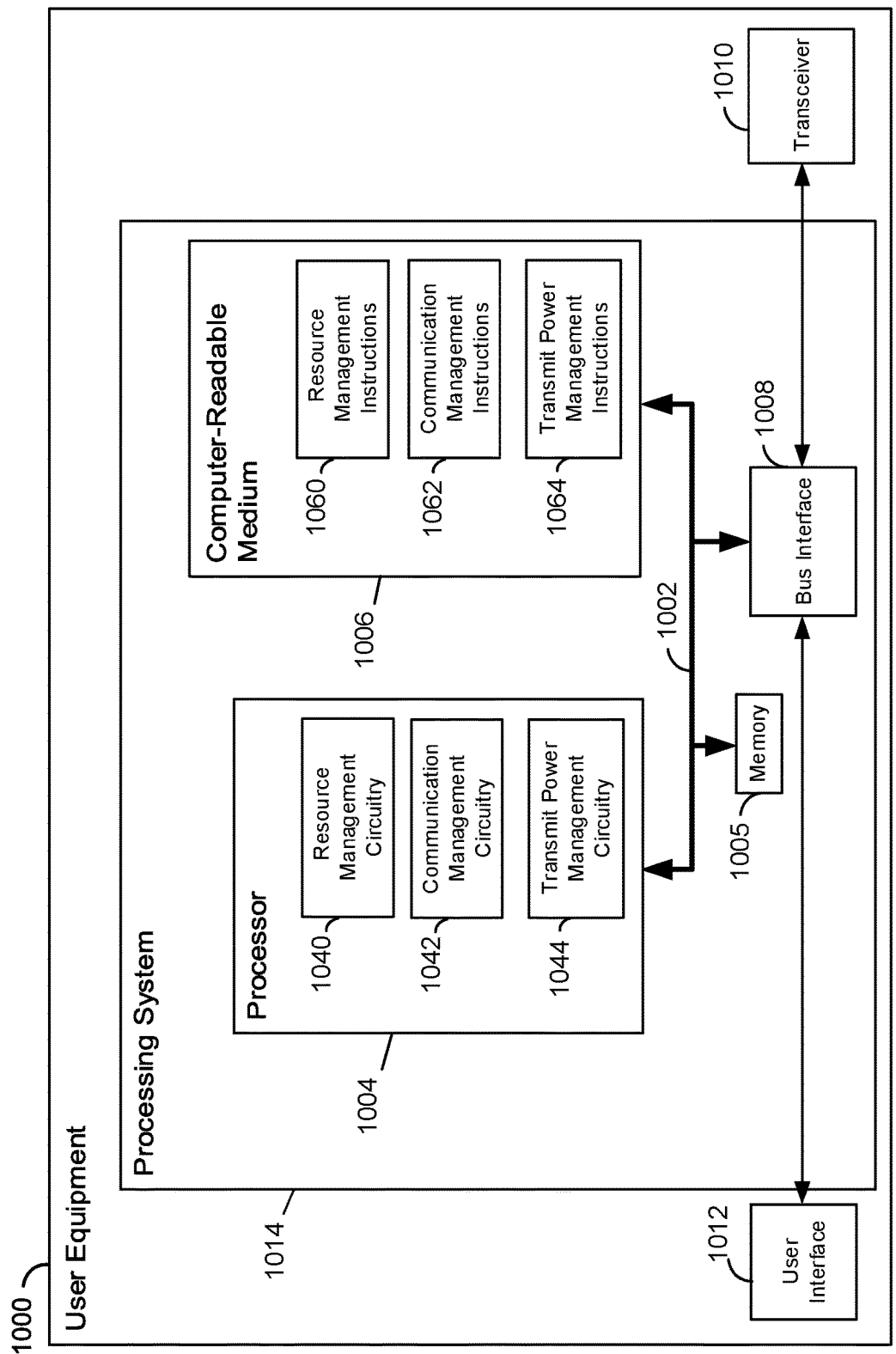

FIG. 10 is a block diagram illustrating an example of a hardware implementation for a UE 1000 employing a processing system 1014. For example, the UE 1000 may be a UE as illustrated in any one or more of FIGS. 1-4. In some aspects, the UE 1000 may be the apparatus 900 depicted in FIG. 9.

The UE 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1000 may be configured to perform any one or more of the functions described herein. That is, the processor 1004, as utilized in a UE 1000, may be used to implement any one or more of the processes and procedures described below and illustrated in FIGS. 5-6.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable storage medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a communication interface or means for communicating with various other apparatus over a transmission medium. Depending upon the nature of the apparatus, a user interface 1012 (e.g., keypad, display, speaker, microphone, joystick) may also be provided.

In some aspects of the disclosure, the processor 1004 may include resource management circuitry 1040 configured for various functions, including, for example, determining communication resources to be used. For example, in some aspects, the resource management circuitry 1040 may include, or be included in, the determination component 908, depicted in FIG. 9. In some aspects of the disclosure, the processor 1004 may include communication management circuitry 1042 configured for various functions, including, for example, transmitting and receiving communications. For example, in some aspects, the communication management circuitry 1042 may include, or be included in, the reception component 902 and/or the transmission component 904, depicted in FIG. 9. In some aspects of the disclosure, the processor 1004 may include transmit power management circuitry 1044 configured for various functions, including, for example, determining and configuring transmit power for transmissions. For example, in some aspects, the transmit power management circuitry 1044 may include, or be included in, the determination component 908 and/or the transmission component 904, depicted in FIG. 9.

The processor 1004 is responsible for managing the bus 1002 and general processing, including the execution of software stored on the computer-readable storage medium 1006. The software, when executed by the processor 1004, causes the processing system 1014 to perform the various functions described below for any particular apparatus. The computer-readable storage medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1006. The computer-readable storage medium 1006 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 1006 may reside in the processing system 1014, external to the processing system 1014, or distributed across multiple entities including the processing system 1014. The computer-readable storage medium 1006 may be embodied in a computer program product. By way of example, a computer program product may include a computer-readable storage medium in packaging materials. Those skilled in the art will recognize how best to implement the described functionality presented throughout this disclosure depending on the particular application and the overall design constraints imposed on the overall system.

In one or more examples, the computer-readable storage medium 1006 may include resource management software/instructions 1060 configured for various functions, including, for example, determining communication resources to be used. For example, the resource management software/instructions 1060 may include, or be included in, the determination component 908, depicted in FIG. 9. In one or more examples, the computer-readable storage medium 1006 may include communication management software/instructions 1062 configured for various functions, including, for example, transmitting and receiving communications. For example, the communication management software/instructions 1062 may include, or be included in, the reception component 902 and/or the transmission component 904, depicted in FIG. 9. In one or more examples, the computer-readable storage medium 1006 may include transmit power management software/instructions 1064 configured for various functions, including, for example, determining and configuring transmit power for transmissions. For example, the transmit power management software/instructions 1064 may include, or be included in, the determination component 908 and/or the transmission component 904, depicted in FIG. 9.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
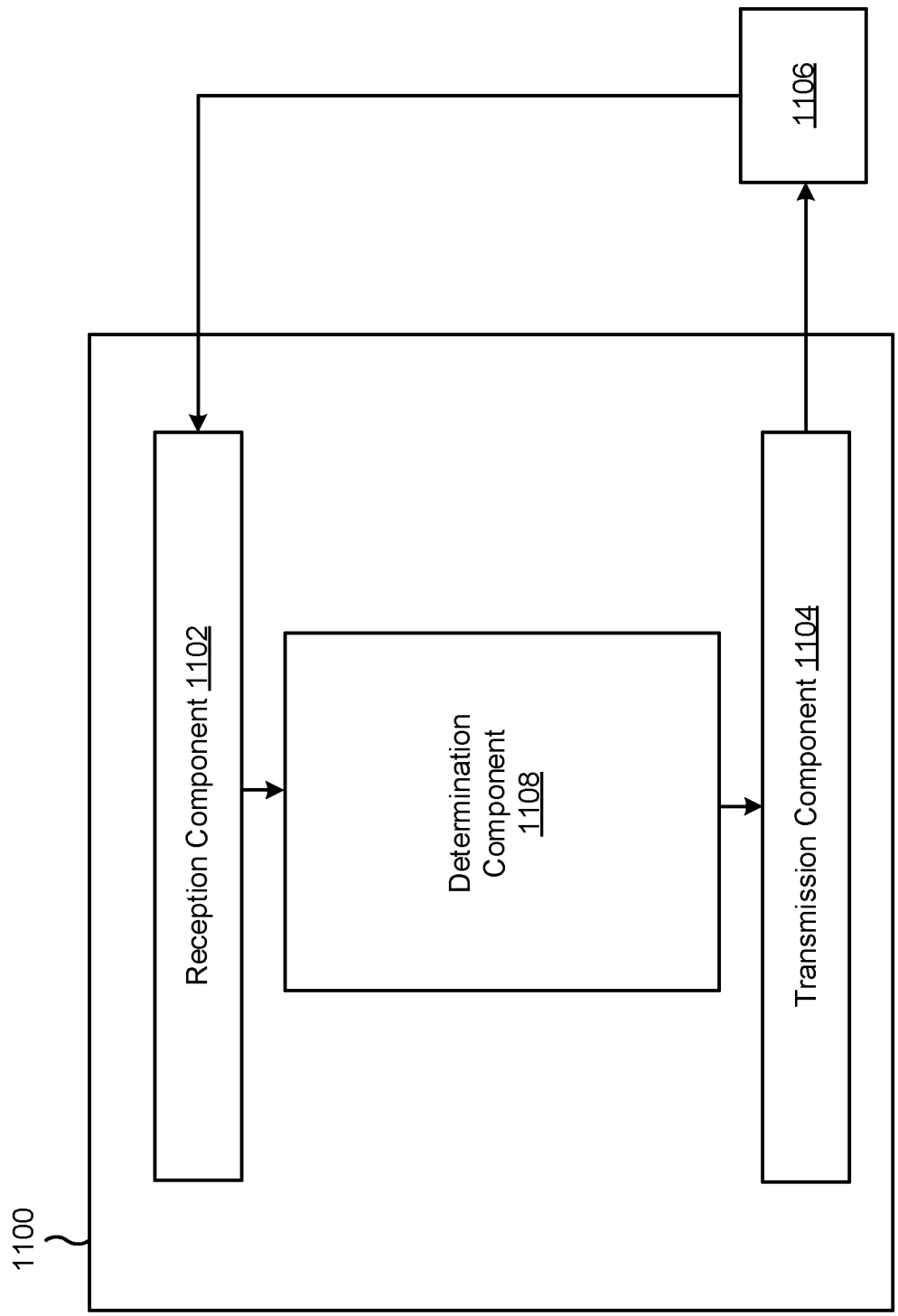

FIG. 11 is a block diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a determination component 1108.

In some aspects, the apparatus 1100 may be configured to perform one or more operations described herein in connection with FIG. 4. Additionally, or alternatively, the apparatus 1100 may be configured to perform one or more processes described herein, such as process 700 of FIG. 7, process 800 of FIG. 8, or a combination thereof. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

The reception component 1102 may receive, from a UE, a request for PUSCH repetition associated with an RRC connection request message of a RACH procedure. The reception component 1102 may receive, from a UE, a PRACH message using one or more alternate frequency resources for a PRACH transmission.

The determination component 1108 may determine PUSCH repetition information based on the one or more alternate frequency resources used to receive the PRACH message, wherein a use of the one or more alternate frequency resources communicates the PUSCH repetition information. In some aspects, the determination component 1108 may include one or more antennas, a modulator, a transmit MIMO processor, a transmit processor, a demodulator, a MIMO detector, a receive processor, a controller/processor, a memory, or a combination thereof, of the base station described above in connection with FIG. 2. In some aspects, the determination component 1108 may include the reception component 1102 and/or the transmission component 1104.

The reception component 1102 may receive, from the UE, a PUSCH message and at least one repetition of the PUSCH message based on the PUSCH repetition information. The reception component 1102 may receive at least one PUSCH repetition associated with the RRC connection request message based at least in part on the request. The determination component 1108 may determine that a PRACH message indicates a PUSCH repetition request.

The transmission component 1104 may transmit at least one of an indication of one or more PUSCH resources or a PUSCH parameter based on the PUSCH repetition information wherein the PUSCH message and the at least one repetition of the PUSCH message is received using at least one of the one or more PUSCH resources or the PUSCH parameter. The transmission component 1104 may transmit, from the base station, a resource parameter indicating the one or more alternate frequency resources wherein the one or more alternative frequency resources are determined based on the resource parameter. The transmission component 1104 may transmit the at least one transmit power parameter to the UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
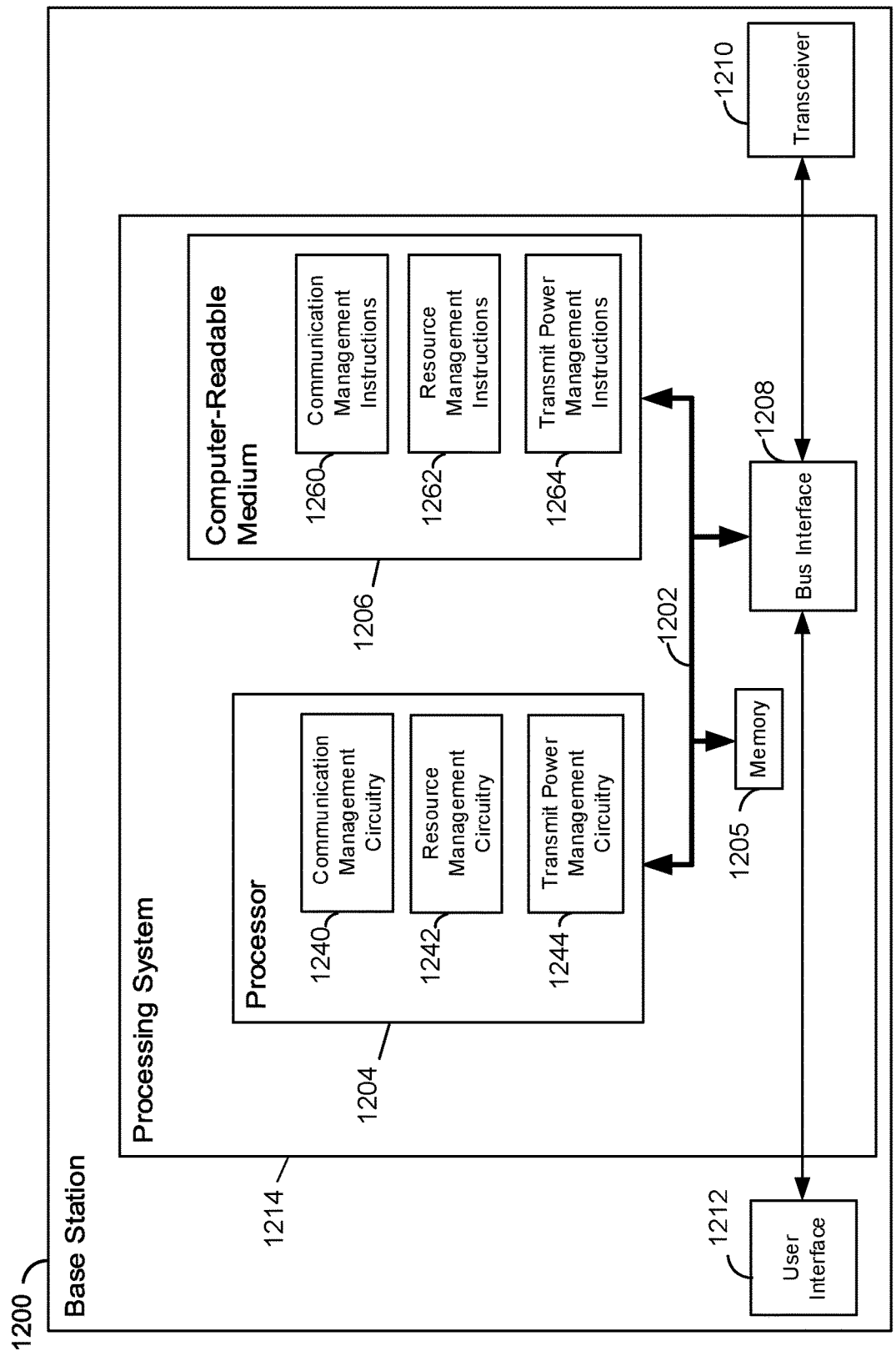

FIG. 12 is a conceptual diagram illustrating an example of a hardware implementation for an exemplary base station 1200 employing a processing system 1214. In accordance with various aspects of the disclosure, an element, or any portion of an element, or any combination of elements may be implemented with a processing system 1214 that includes one or more processors 1204. For example, the base station 1200 may be a base station as illustrated in any one or more of FIGS. 1-4. In some aspects, the base station 1200 may be the apparatus 1100 depicted in FIG. 11.

The processing system 1214 may be substantially the same as the processing system 1014 illustrated in FIG. 10, including a bus interface 1208, a bus 1202, memory 1205, a processor 1204, and a computer-readable storage medium 1206. Furthermore, the base station 1200 may include a user interface 1212 and a transceiver 1210 substantially similar to those described above in FIG. 10. That is, the processor 1204, as utilized in a base station 1200, may be used to implement any one or more of the processes described below and illustrated in FIGS. 7-8.

In some aspects of the disclosure, the processor 1204 may include communication management circuitry 1240 configured for various functions, including, for example, transmitting and receiving communications. For example, the communication management circuitry 1240 may include, or be included in, the reception component 1102 and/or the transmission component 1104, depicted in FIG. 11. In some aspects of the disclosure, the processor 1204 may include resource management circuitry 1242 configured for various functions, including, for example, determining communication resources to be used. For example, the resource management circuitry 1242 may include, or be included in, the determination component 1108, depicted in FIG. 11. In some aspects of the disclosure, the processor 1204 may include transmit power management circuitry 1244 configured for various functions, including, for example, determining and configuring transmit power for transmissions. For example, the transmit power management circuitry 1244 may include, or be included in, the determination component 1108 and/or the transmission component 1104, depicted in FIG. 11.

In one or more examples, the computer-readable storage medium 1206 may include communication management software/instructions 1260 configured for various functions, including, for example, transmitting and receiving communications. For example, the communication management software/instructions 1260 may include, or be included in, the reception component 1102 and/or the transmission component 1104, depicted in FIG. 11. In one or more examples, the computer-readable storage medium 1206 may include resource management software/instructions 1262 configured for various functions, including, for example, determining communication resources to be used. For example, the resource management software/instructions 1262 may include, or be included in, the determination component 1108, depicted in FIG. 11. In one or more examples, the computer-readable storage medium 1206 may include transmit power management software/instructions 1264 configured for various functions, including, for example, determining and configuring transmit power for transmissions. For example, the transmit power management software/instructions 1264 may include, or be included in, the determination component 1108 and/or the transmission component 1104, depicted in FIG. 11.

The following provides an overview of some aspects of the present disclosure:

Aspect 1: A method of wireless communication performed by a user equipment (UE), comprising: transmitting, to a base station, a request for physical uplink shared channel (PUSCH) repetition associated with a radio resource control (RRC) connection request message of a random access channel (RACH) procedure; and transmitting at least one PUSCH repetition associated with the RRC connection request message based at least in part on the request.

Aspect 2: The method of aspect 1, wherein the request for PUSCH repetition indicates one or more suggested parameters corresponding to the PUSCH repetition.

Aspect 3: The method of aspect 2, wherein the one or more suggested parameters indicates a number of PUSCH repetitions.

Aspect 4: The method of any of aspects 1-3, wherein the request for PUSCH repetition indicates a request for an aggregated demodulation reference signal for cross-slot channel estimation.

Aspect 5: The method of any of aspects 1-4, wherein the request for PUSCH repetition comprises a request for PUSCH repetition associated with one or more transmission configuration indicators.

Aspect 6: The method of any of aspects 1-5, wherein the request for PUSCH repetition comprises a request for PUSCH repetition with frequency hopping.

Aspect 7: The method of any of aspects 1-6, wherein transmitting the request for PUSCH repetition comprises transmitting a physical RACH (PRACH) message that indicates the request for PUSCH repetition.

Aspect 8: The method of aspect 7, wherein transmitting the request for PUSCH repetition comprises repeating the PRACH message over a plurality of RACH occasions.

Aspect 9: The method of either of aspects 7 or 8, wherein transmitting the request for PUSCH repetition comprises transmitting a PRACH preamble that is selected from a subset of PRACH preambles of a set of PRACH preambles, wherein the subset indicates the request for PUSCH repetition.

Aspect 10: The method of any of aspects 7-9, wherein transmitting the request for PUSCH repetition comprises transmitting the PRACH message using a subset of RACH occasions (ROs) of a set of ROs, wherein the subset of ROs indicates the request for PUSCH repetition.

Aspect 11: The method of any of aspects 7-10, wherein transmitting the request for PUSCH repetition comprises transmitting the PRACH message using a PRACH format that indicates the request for PUSCH repetition.

Aspect 12: The method of any of aspects 7-11, wherein transmitting the PRACH message comprises transmitting the PRACH message based at least in part on one or more PRACH parameters.

Aspect 13: The method of aspect 12, further comprising selecting the one or more PRACH parameters based at least in part on a relationship between the one or more PRACH parameters and one or more request parameters corresponding to the request for PUSCH repetition.

Aspect 14: The method of aspect 13, further comprising receiving, from the base station, a parameter configuration that indicates the relationship.

Aspect 15: The method of aspect 14, wherein the parameter configuration is carried in system information.

Aspect 16: The method of aspect 15, wherein the system information comprises remaining minimum system information.

Aspect 17: The method of any of aspects 13-16, wherein the relationship is indicated by a wireless communication standard.

Aspect 18: The method of any of aspects 1-17, further comprising determining that one or more trigger criteria are satisfied, wherein transmitting the request for PUSCH repetition comprises transmitting the request for PUSCH repetition based at least in part on determining that the one or more trigger criteria are satisfied.

Aspect 19: The method of aspect 18, further comprising receiving, from the base station, a trigger configuration that indicates the one or more trigger criteria.

Aspect 20: The method of aspect 19, wherein the trigger configuration is carried in system information.

Aspect 21: The method of aspect 20, wherein the system information comprises remaining minimum system information.

Aspect 22: The method of any of aspects 18-21, wherein the one or more trigger criteria comprise a first reference signal received power (RSRP) threshold.

Aspect 23: The method of aspect 22, further comprising determining a first synchronization signal block (SSB) based RSRP, wherein determining that the one or more trigger criteria are satisfied comprises determining that the first SSB based RSRP satisfies the first RSRP threshold.

Aspect 24: The method of aspect 23, wherein the one or more trigger criteria comprise a second RSRP threshold.

Aspect 25: The method of aspect 24, further comprising determining a second SSB based RSRP, wherein determining that the one or more trigger criteria are satisfied comprises determining that the second SSB based RSRP satisfies the second RSRP threshold.

Aspect 26: The method of aspect 25, wherein the request for PUSCH repetition indicates a first number of requested PUSCH repetitions based at least in part on determining that the first SSB based RSRP satisfies the first RSRP threshold, and wherein the request for PUSCH repetition indicates a second number of requested PUSCH repetitions based at least in part on determining that the second SSB based RSRP satisfies the second RSRP threshold.

Aspect 27: The method of any of aspects 18-27, wherein the one or more trigger criteria are indicated in a wireless communication standard.

Aspect 28: The method of any of aspects 1-27, wherein transmitting the at least one PUSCH repetition comprises transmitting the at least one PUSCH repetition based at least in part on transmitting the request for PUSCH repetition.

Aspect 29: The method of any of aspects 1-28, further comprising: receiving, from the base station, a random access response (RAR) message, wherein the RAR message indicates at least one of: a PUSCH resource for the RRC connection request message, or a PUSCH parameter associated with the RRC connection request message; and determining, based at least in part on the RAR message, at least one of a PUSCH repetition parameter or a PUSCH repetition resource.

Aspect 30: The method of aspect 29, wherein determining the at least one of the PUSCH repetition parameter or the PUSCH repetition resource comprises determining the at least one of the PUSCH repetition parameter or the PUSCH repetition resource based at least in part on one or more rules indicated by a wireless communication standard.

Aspect 31: The method of any of aspects 1-30, further comprising receiving, from the base station, an indication of a PUSCH repetition request grant, wherein the PUSCH repetition request grant corresponds to at least a portion of the PUSCH repetition request.

Aspect 32: The method of aspect 31, wherein the indication of the PUSCH repetition request grant is carried in a random access response (RAR) message.

Aspect 33: The method of aspect 32, wherein the indication of the PUSCH repetition request grant is carried in a physical downlink control channel portion of the RAR message.

Aspect 34: A method of wireless communication performed by a base station, comprising: receiving, from a user equipment (UE), a request for physical uplink shared channel (PUSCH) repetition associated with a radio resource control (RRC) connection request message of a random access channel (RACH) procedure; and receiving at least one PUSCH repetition associated with the RRC connection request message based at least in part on the request.

Aspect 35: The method of aspect 34, wherein the request for PUSCH repetition indicates one or more suggested parameters corresponding to the PUSCH repetition.

Aspect 36: The method of aspect 35, wherein the one or more suggested parameters indicates a number of PUSCH repetitions.

Aspect 37: The method of any of aspects 34-36, wherein the request for PUSCH repetition indicates a request for an aggregated demodulation reference signal for cross-slot channel estimation.

Aspect 38: The method of any of aspects 34-37, wherein the request for PUSCH repetition comprises a request for PUSCH repetition associated with one or more transmission configuration indicators.

Aspect 39: The method of any of aspects 34-38, wherein the request for PUSCH repetition comprises a request for PUSCH repetition with frequency hopping.

Aspect 40: The method of any of aspects 34-39, wherein receiving the request for PUSCH repetition comprises receiving a physical RACH (PRACH) message that indicates the request for PUSCH repetition.

Aspect 41: The method of aspect 40, wherein receiving the request for PUSCH repetition comprises receiving a repeated PRACH message over a plurality of RACH occasions.

Aspect 42: The method of either of aspects 40 or 41, wherein receiving the request for PUSCH repetition comprises receiving a PRACH preamble that is selected from a subset of PRACH preambles of a set of PRACH preambles, wherein the subset indicates the request for PUSCH repetition.

Aspect 43: The method of any of aspects 40-42, wherein receiving the request for PUSCH repetition comprises receiving the PRACH message using a subset of RACH occasions (ROs) of a set of ROs, wherein the subset of ROs indicates the request for PUSCH repetition.

Aspect 44: The method of any of aspects 40-43, wherein receiving the request for PUSCH repetition comprises receiving the PRACH message using a PRACH format that indicates the request for PUSCH repetition.

Aspect 45: The method of any of aspects 40-44, wherein receiving the PRACH message comprises receiving the PRACH message based at least in part on one or more PRACH parameters.

Aspect 46: The method of aspect 45, wherein a selection of the one or more PRACH parameters is based at least in part on a relationship between the one or more PRACH parameters and one or more request parameters corresponding to the request for PUSCH repetition.

Aspect 47: The method of aspect 46, further comprising transmitting, to the UE, a parameter configuration that indicates the relationship.

Aspect 48: The method of either of aspects 46 or 47, wherein the parameter configuration is carried in system information.

Aspect 49: The method of aspect 48, wherein the system information comprises remaining minimum system information.

Aspect 50: The method of any of aspects 46-49, wherein the relationship is indicated by a wireless communication standard.

Aspect 51: The method of any of aspects 34-50, wherein receiving the request for PUSCH repetition comprises receiving the request for PUSCH repetition based at least in part on a determination that one or more trigger criteria are satisfied.

Aspect 52: The method of aspect 51, further comprising transmitting, to the UE, a trigger configuration that indicates the one or more trigger criteria.

Aspect 53: The method of aspect 52, wherein the trigger configuration is carried in system information.

Aspect 54: The method of aspect 53, wherein the system information comprises remaining minimum system information.

Aspect 55: The method of any of aspects 51-54, wherein the one or more trigger criteria comprise a first reference signal received power (RSRP) threshold.

Aspect 56: The method of aspect 55, wherein a determination that the one or more trigger criteria are satisfied comprises a determination that a first synchronization signal block (SSB) based RSRP satisfies the first RSRP threshold.

Aspect 57: The method of aspect 56, wherein the one or more trigger criteria comprise a second RSRP threshold.

Aspect 58: The method of aspect 57, wherein a determination that the one or more trigger criteria are satisfied comprises a determination that a second SSB based RSRP satisfies the second RSRP threshold.

Aspect 59: The method of aspect 58, wherein the request for PUSCH repetition indicates a first number of requested PUSCH repetitions based at least in part on the determination that the first SSB based RSRP satisfies the first RSRP threshold, and wherein the request for PUSCH repetition indicates a second number of requested PUSCH repetitions based at least in part on the determination that the second SSB based RSRP satisfies the second RSRP threshold.

Aspect 60: The method of any of aspects 51-60, wherein the one or more trigger criteria are indicated in a wireless communication standard.

Aspect 61: The method of any of aspects 34-60, wherein receiving the at least one PUSCH repetition comprises receiving the at least one PUSCH repetition based at least in part on the request for PUSCH repetition.

Aspect 62: The method of any of aspects 34-61, further comprising: transmitting, to the UE, a random access response (RAR) message, wherein the RAR message indicates at least one of: a PUSCH resource for the RRC connection request message, or a PUSCH parameter associated with the RRC connection request message.

Aspect 63: The method of aspect 62, wherein a determination of the at least one of the PUSCH repetition parameter or the PUSCH repetition resource comprises a determination of the at least one of the PUSCH repetition parameter or the PUSCH repetition resource based at least in part on one or more rules indicated by a wireless communication standard.

Aspect 64: The method of any of aspects 34-63, further comprising transmitting, to the UE, an indication of a PUSCH repetition request grant, wherein the PUSCH repetition request grant corresponds to at least a portion of the PUSCH repetition request.

Aspect 65: The method of aspect 64, wherein the indication of the PUSCH repetition request grant is carried in a random access response (RAR) message.

Aspect 66: The method of either of aspects 64 or 65, wherein the indication of the PUSCH repetition request grant is carried in a physical downlink control channel portion of the RAR message.

Aspect 67: A method of wireless communication by a user equipment (UE), comprising: determining one or more alternate frequency resources for a physical random access channel (PRACH) transmission, wherein a use of the one or more alternate frequency resources communicates physical uplink shared channel (PUSCH) repetition information; and transmitting, to a base station, a PRACH message using the one or more alternate frequency resources to communicate the PUSCH repetition information.

Aspect 68: The method of aspect 67, wherein the one or more alternate frequency resources are different from one or more frequency resources for a PRACH transmission associated with a single PUSCH transmission without a PUSCH repetition.

Aspect 69: The method of either of aspect 67 or 68, further comprising: transmitting a PUSCH message and at least one repetition of the PUSCH message based on the PUSCH repetition information.

Aspect 70: The method of any of aspects 67-69, further comprising: receiving at least one of an indication of one or more PUSCH resources or a PUSCH parameter based on the PUSCH repetition information, wherein the PUSCH message and the at least one repetition of the PUSCH message is transmitted using at least one of the one or more PUSCH resources or the PUSCH parameter.

Aspect 71: The method of any of aspects 67-70, further comprising: receiving, from the base station, a resource parameter indicating the one or more alternate frequency resources, wherein the one or more alternative frequency resources are determined based on the resource parameter.

Aspect 72: The method of aspect 71, wherein the resource parameter is received via system information.

Aspect 73: The method of aspect 72, wherein the system information includes remaining minimum system information (RMSI).

Aspect 74: The method of any of aspects 71-73, wherein the resource parameter includes a frequency offset, and wherein the determining the one or more alternate frequency resources comprises: determining the one or more alternate frequency resources by applying the frequency offset to one or more frequency resources for a PRACH transmission associated with a single PUSCH transmission without a PUSCH repetition.

Aspect 75: The method of any of aspects 67-74, further comprising: determining at least one transmit power parameter associated with a transmit power for a PUSCH repetition; and configuring the transmit power for the PUSCH repetition based on the at least one transmit power parameter.

Aspect 76: The method of aspect 75, wherein the at least one transmit power parameter is determined based on the one or more alternate frequency resources determined for the PRACH transmission.

Aspect 77: The method of either of aspects 75 or 76, wherein the determining the at least one transmit power parameter comprises: receiving the at least one transmit power parameter from the base station.

Aspect 78: The method of any of aspects 75-77, wherein the at least one transmit power parameter includes a power offset value between the transmit power for the PUSCH repetition and a second transmit power for the PRACH transmission.

Aspect 79: The method of any of aspects 67-78, wherein the PUSCH repetition information indicates one or more parameters corresponding to at least one of a request for a PUSCH repetition or an indication of a UE capability for the PUSCH repetition.

Aspect 80: The method of aspect 79, wherein the one or more parameters include at least one of: the request for the PUSCH repetition, the indication of the UE capability, a number of PUSCH repetitions, an indication that the at least one of the request for the PUSCH repetition or the indication of the UE capability is associated with the PUSCH repetition with a demodulation reference signal (DMRS) aggregation for a cross-slot channel estimation, an indication that the PUSCH repetition is associated with one or more transmission configuration indicators (TCIs), or an indication that the at least one of the request for the PUSCH repetition or the indication of the UE capability is associated with the PUSCH repetition with frequency hopping.

Aspect 81: The method of either of aspects 79 or 80, wherein the one or more alternate frequency resources are different for each of the one or more parameters.

Aspect 82: A method of wireless communication by a base station, comprising: receiving, from a user equipment (UE), a physical random access channel (PRACH) message using one or more alternate frequency resources for a PRACH transmission; and determining physical uplink shared channel (PUSCH) repetition information based on the one or more alternate frequency resources used to receive the PRACH message, wherein a use of the one or more alternate frequency resources communicates the PUSCH repetition information.

Aspect 83: The method of aspect 82, wherein the one or more alternate frequency resources are different from one or more frequency resources for a PRACH transmission associated with a single PUSCH transmission without a PUSCH repetition.

Aspect 84: The method of either of aspects 82 or 83, further comprising: receiving, from the UE, a PUSCH message and at least one repetition of the PUSCH message based on the PUSCH repetition information.

Aspect 85: The method of any of aspects 82-84, further comprising: transmitting at least one of an indication of one or more PUSCH resources or a PUSCH parameter based on the PUSCH repetition information, wherein the PUSCH message and the at least one repetition of the PUSCH message is received using at least one of the one or more PUSCH resources or the PUSCH parameter.

Aspect 86: The method of any of aspects 82-85, further comprising: transmitting a resource parameter indicating the one or more alternate frequency resources, wherein the one or more alternative frequency resources are determined based on the resource parameter.

Aspect 87: The method of aspect 86, wherein the resource parameter is transmitted via system information.

Aspect 88: The method of aspect 87, wherein the system information includes remaining minimum system information (RMSI).

Aspect 89: The method of any of aspects 86-88, wherein the resource parameter includes a frequency offset, and wherein the one or more alternative frequency resources are determined by applying the frequency offset to one or more frequency resources for a PRACH transmission associated with a single PUSCH transmission without a PUSCH repetition.

Aspect 90: The method of any of aspects 82-87, wherein a transmit power for a PUSCH repetition is configured based on at least one transmit power parameter associated with the transmit power.

Aspect 91: The method of aspect 90, wherein the at least one transmit power parameter is determined based on the one or more alternate frequency resources determined for the PRACH transmission.

Aspect 92: The method of either of aspects 90 or 91, further comprising: transmitting the at least one transmit power parameter to the UE.

Aspect 93: The method of any of aspects 90-92, wherein the at least one transmit power parameter includes a power offset value between the transmit power for the PUSCH repetition and a second transmit power for the PRACH transmission.

Aspect 94: The method of any of aspects 82-93, wherein the PUSCH repetition information indicates one or more parameters corresponding to at least one of a request for a PUSCH repetition or an indication of a UE capability for the PUSCH repetition.

Aspect 95: The method of aspect 94, wherein the one or more parameters include at least one of: the request for the PUSCH repetition, the indication of the UE capability, a number of PUSCH repetitions, an indication that the at least one of the request for the PUSCH repetition or the indication of the UE capability is associated with the PUSCH repetition with a demodulation reference signal (DMRS) aggregation for a cross-slot channel estimation, an indication that the PUSCH repetition is associated with one or more transmission configuration indicators (TCIs), or an indication that the at least one of the request for the PUSCH repetition or the indication of the UE capability is associated with the PUSCH repetition with frequency hopping.

Aspect 96: The method of either of aspects 94 or 95, wherein the one or more alternate frequency resources are different for each of the one or more parameters.

Aspect 97: A method for wireless communication by a user equipment (UE), comprising: transmitting, to a base station, a physical random access channel procedure (PRACH) message that includes a request for physical uplink shared channel (PUSCH) repetition associated with a radio resource control (RRC) connection request message of a random access channel (RACH) procedure; and transmitting at least one PUSCH repetition associated with the RRC connection request message based at least in part on the request.

Aspect 98: The method of aspect 97, wherein transmitting the request for PUSCH repetition comprises repeating the PRACH message over a plurality of RACH occasions.

Aspect 99: The method of either of aspects 97 or 98, wherein transmitting the request for PUSCH repetition comprises transmitting a PRACH preamble that is selected from a subset of PRACH preambles of a set of PRACH preambles, wherein the subset indicates the request for PUSCH repetition.

Aspect 100: The method of any of aspects 97-99, wherein transmitting the request for PUSCH repetition comprises transmitting the PRACH message using a subset of RACH occasions (ROs) of a set of ROs, wherein the subset of ROs indicates the request for PUSCH repetition.

Aspect 101: The method of any of aspects 97-100, wherein transmitting the PRACH message comprises transmitting the PRACH message based at least in part on one or more PRACH parameters.

Aspect 102: A method for wireless communication by a user equipment (UE), comprising: transmitting, to a base station and based at least in part on a determination that one or more trigger criteria are satisfied, a physical random access channel procedure (PRACH) message that includes a request for physical uplink shared channel (PUSCH) repetition associated with a radio resource control (RRC) connection request message of a random access channel (RACH) procedure, wherein the one or more trigger criteria comprise a reference signal received power threshold; and transmitting at least one PUSCH repetition associated with the RRC connection request message based at least in part on the request.

Aspect 103: The method of aspect 102, wherein transmitting the request for PUSCH repetition comprises transmitting a physical RACH (PRACH) message that indicates the request for PUSCH repetition.

Aspect 104: The method of either of aspects 102 or 103, further comprising determining a first synchronization signal block (SSB) based RSRP, wherein determining that the one or more trigger criteria are satisfied comprises determining that the first SSB based RSRP satisfies the first RSRP threshold.

Aspect 105: A method for wireless communication by a user equipment (UE), comprising: transmitting, to a base station and based at least in part on a determination that one or more trigger criteria are satisfied, a physical random access channel procedure (PRACH) message that includes a request for physical uplink shared channel (PUSCH) repetition associated with a radio resource control (RRC) connection request message of a random access channel (RACH) procedure, wherein the one or more trigger criteria comprise a reference signal received power threshold; receiving, from the base station, an indication of a PUSCH repetition request grant, wherein the PUSCH repetition request grant corresponds to at least a portion of the PUSCH repetition request; and transmitting at least one PUSCH repetition associated with the RRC connection request message based at least in part on the request.

Aspect 106: The method of aspect 105, wherein the indication of the PUSCH repetition request grant is carried in a random access response (RAR) message.

Aspect 107: An apparatus for wireless communication at a device, comprising a processor; memory coupled with the processor; and instructions stored in the memory and executable by the processor to cause the apparatus to perform the method of one or more aspects of aspects 1-33.

Aspect 108: A device for wireless communication, comprising a memory and one or more processors coupled to the memory, the memory and the one or more processors configured to perform the method of one or more aspects of aspects 1-33.

Aspect 109: An apparatus for wireless communication, comprising at least one means for performing the method of one or more aspects of aspects 1-33.

Aspect 110: A non-transitory computer-readable medium storing code for wireless communication, the code comprising instructions executable by a processor to perform the method of one or more aspects of aspects 1-33.

Aspect 111: A non-transitory computer-readable medium storing a set of instructions for wireless communication, the set of instructions comprising one or more instructions that, when executed by one or more processors of a device, cause the device to perform the method of one or more aspects of aspects 1-33.

Aspect 112: An apparatus for wireless communication at a device, comprising a processor; memory coupled with the processor; and instructions stored in the memory and executable by the processor to cause the apparatus to perform the method of one or more aspects of aspects 34-66.

Aspect 113: A device for wireless communication, comprising a memory and one or more processors coupled to the memory, the memory and the one or more processors configured to perform the method of one or more aspects of aspects 34-66.

Aspect 114: An apparatus for wireless communication, comprising at least one means for performing the method of one or more aspects of aspects 34-66.

Aspect 115: A non-transitory computer-readable medium storing code for wireless communication, the code comprising instructions executable by a processor to perform the method of one or more aspects of aspects 34-66.

Aspect 116: A non-transitory computer-readable medium storing a set of instructions for wireless communication, the set of instructions comprising one or more instructions that, when executed by one or more processors of a device, cause the device to perform the method of one or more aspects of aspects 34-66.

Aspect 117: An apparatus for wireless communication at a device, comprising a processor; memory coupled with the processor; and instructions stored in the memory and executable by the processor to cause the apparatus to perform the method of one or more aspects of aspects 67-81.

Aspect 118: A device for wireless communication, comprising a memory and one or more processors coupled to the memory, the memory and the one or more processors configured to perform the method of one or more aspects of aspects 67-81.

Aspect 119: An apparatus for wireless communication, comprising at least one means for performing the method of one or more aspects of aspects 67-81.

Aspect 120: A non-transitory computer-readable medium storing code for wireless communication, the code comprising instructions executable by a processor to perform the method of one or more aspects of aspects 67-81.

Aspect 121: A non-transitory computer-readable medium storing a set of instructions for wireless communication, the set of instructions comprising one or more instructions that, when executed by one or more processors of a device, cause the device to perform the method of one or more aspects of aspects 67-81.

Aspect 122: An apparatus for wireless communication at a device, comprising a processor; memory coupled with the processor; and instructions stored in the memory and executable by the processor to cause the apparatus to perform the method of one or more aspects of aspects 82-96.

Aspect 123: A device for wireless communication, comprising a memory and one or more processors coupled to the memory, the memory and the one or more processors configured to perform the method of one or more aspects of aspects 82-96.

Aspect 124: An apparatus for wireless communication, comprising at least one means for performing the method of one or more aspects of aspects 82-96.

Aspect 125: A non-transitory computer-readable medium storing code for wireless communication, the code comprising instructions executable by a processor to perform the method of one or more aspects of aspects 82-96.

Aspect 126: A non-transitory computer-readable medium storing a set of instructions for wireless communication, the set of instructions comprising one or more instructions that, when executed by one or more processors of a device, cause the device to perform the method of one or more aspects of aspects 82-96.

Aspect 127: An apparatus for wireless communication at a device, comprising a processor; memory coupled with the processor; and instructions stored in the memory and executable by the processor to cause the apparatus to perform the method of one or more aspects of aspects 97-101.

Aspect 128: A device for wireless communication, comprising a memory and one or more processors coupled to the memory, the memory and the one or more processors configured to perform the method of one or more aspects of aspects 97-101.

Aspect 129: An apparatus for wireless communication, comprising at least one means for performing the method of one or more aspects of aspects 97-101.

Aspect 130: A non-transitory computer-readable medium storing code for wireless communication, the code comprising instructions executable by a processor to perform the method of one or more aspects of aspects 97-101.

Aspect 131: A non-transitory computer-readable medium storing a set of instructions for wireless communication, the set of instructions comprising one or more instructions that, when executed by one or more processors of a device, cause the device to perform the method of one or more aspects of aspects 97-101.

Aspect 132: An apparatus for wireless communication at a device, comprising a processor; memory coupled with the processor; and instructions stored in the memory and executable by the processor to cause the apparatus to perform the method of one or more aspects of aspects 102-104.

Aspect 133: A device for wireless communication, comprising a memory and one or more processors coupled to the memory, the memory and the one or more processors configured to perform the method of one or more aspects of aspects 102-104.

Aspect 134: An apparatus for wireless communication, comprising at least one means for performing the method of one or more aspects of aspects 102-104.

Aspect 135: A non-transitory computer-readable medium storing code for wireless communication, the code comprising instructions executable by a processor to perform the method of one or more aspects of aspects 102-104.

Aspect 136: A non-transitory computer-readable medium storing a set of instructions for wireless communication, the set of instructions comprising one or more instructions that, when executed by one or more processors of a device, cause the device to perform the method of one or more aspects of aspects 102-104.

Aspect 137: An apparatus for wireless communication at a device, comprising a processor; memory coupled with the processor; and instructions stored in the memory and executable by the processor to cause the apparatus to perform the method of one or more aspects of aspects 105-106.

Aspect 138: A device for wireless communication, comprising a memory and one or more processors coupled to the memory, the memory and the one or more processors configured to perform the method of one or more aspects of aspects 105-106.

Aspect 139: An apparatus for wireless communication, comprising at least one means for performing the method of one or more aspects of aspects 105-106.

Aspect 140: A non-transitory computer-readable medium storing code for wireless communication, the code comprising instructions executable by a processor to perform the method of one or more aspects of aspects 105-106.

Aspect 141: A non-transitory computer-readable medium storing a set of instructions for wireless communication, the set of instructions comprising one or more instructions that, when executed by one or more processors of a device, cause the device to perform the method of one or more aspects of aspects 105-106.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors operatively coupled to the memory, the memory and the one or more processors configured to:
   transmit, to a base station, a request for physical uplink shared channel (PUSCH) repetition associated with a radio resource control (RRC) connection request message of a random access channel (RACH) procedure, wherein the request includes a physical RACH (PRACH) preamble selected from a subset of PRACH preambles of a set of PRACH preambles, the subset of the PRACH preambles being indictive of the request for PUSCH repetition; and
   transmit at least one PUSCH repetition associated with the RRC connection request message based at least in part on the request.

2. The UE of claim 1, wherein the request for PUSCH repetition indicates one or more suggested parameters corresponding to the PUSCH repetition.

3. The UE of claim 1, wherein the memory and the one or more processors, when transmitting the request for PUSCH repetition, are configured to transmit a PRACH message that indicates the request for PUSCH repetition.

4. The UE of claim 3, wherein the memory and the one or more processors, when transmitting the request for PUSCH repetition, are configured to repeat the PRACH message over a plurality of RACH occasions.

5. The UE of claim 3, wherein the memory and the one or more processors, when transmitting the request for PUSCH repetition, are configured to transmit the PRACH message using a subset of RACH occasions (ROs) of a set of ROs.

6. The UE of claim 3, wherein the memory and the one or more processors, when transmitting the PRACH message, are configured to transmit the PRACH message based at least in part on one or more PRACH parameters.

7. The UE of claim 6, wherein the memory and the one or more processors are further configured to select the one or more PRACH parameters based at least in part on a relationship between the one or more PRACH parameters and one or more request parameters corresponding to the request for PUSCH repetition.

8. The UE of claim 7, wherein the memory and the one or more processors are further configured to receive, from the base station, a parameter configuration that indicates the relationship.

9. The UE of claim 8, wherein the parameter configuration is carried in system information.

10. The UE of claim 9, wherein the system information comprises remaining minimum system information.

11. The UE of claim 7, wherein the relationship is indicated by a wireless communication standard.

12. The UE of claim 1, wherein the memory and the one or more processors are further configured to determine that one or more trigger criteria are satisfied, wherein the memory and the one or more processors, when transmitting the request for PUSCH repetition, are configured to transmit the request for PUSCH repetition based at least in part on determining that the one or more trigger criteria are satisfied.

13. The UE of claim 12, wherein the memory and the one or more processors are further configured to receive, from the base station, a trigger configuration that indicates the one or more trigger criteria.

14. The UE of claim 13, wherein the trigger configuration is carried in system information.

15. The UE of claim 14, wherein the system information comprises remaining minimum system information.

16. The UE of claim 12, wherein the one or more trigger criteria comprise a first reference signal received power (RSRP) threshold.

17. The UE of claim 16, wherein the memory and the one or more processors are further configured to determine a first synchronization signal block (SSB) based RSRP, wherein memory and the one or more processors, when determining that the one or more trigger criteria are satisfied, are configured to determine that the first SSB based RSRP satisfies the first RSRP threshold.

18. The UE of claim 17, wherein the one or more trigger criteria comprise a second RSRP threshold.

19. The UE of claim 18, wherein the memory and the one or more processors are further configured to determine a second SSB based RSRP, wherein the memory and the one or more processors, when determining that the one or more trigger criteria are satisfied, are configured to determine that the second SSB based RSRP satisfies the second RSRP threshold.

20. The UE of claim 19, wherein the request for PUSCH repetition indicates a first number of requested PUSCH repetitions based at least in part on determining that, the first SSB based RSRP satisfies the first RSRP threshold, and
wherein the request for PUSCH repetition indicates a second number of requested PUSCH repetitions based at least in part on determining that the second SSB based RSRP satisfies the second RSRP threshold.

21. The UE of claim 12, wherein the one or more trigger criteria are indicated in a wireless communication standard.

22. The UE of claim 1, wherein the memory and the one or more processors, when transmitting the at least one PUSCH repetition, are configured to transmit the at least one PUSCH repetition based at least in part on transmitting the request for PUSCH repetition.

23. The UE of claim 1, wherein the memory and the one or more processors are further configured to:
receive, from the base station, a random access response (RAR) message, wherein the RAR message indicates at least one of:
a PUSCH resource for the RRC connection request message, or
a PUSCH parameter associated with the RRC connection request message; and
determine, based at least in part on the RAR message, at least one of a PUSCH repetition parameter or a PUSCH repetition resource.

24. The UE of claim 23, wherein the memory and the one or more processors, when determining the at least one of the PUSCH repetition parameter or the PUSCH repetition resource, are configured to determine the at least one of the PUSCH repetition parameter or the PUSCH repetition resource based at least in part on one or more rules indicated by a wireless communication standard.

25. The UE of claim 1, wherein the memory and the one or more processors are further configured to receive, from the base station, an indication of a PUSCH repetition request grant, wherein the PUSCH repetition request grant corresponds to at least a portion of the PUSCH repetition request.

26. The UE of claim 25, wherein the indication of the PUSCH repetition request grant is carried in a random access response (RAR) message.

27. The UE of claim 26, wherein the indication of the PUSCH repetition request grant is carried in a physical downlink control channel portion of the RAR message.

28. A user equipment (UE) for wireless communication, comprising:
a memory; and
one or more processors operatively coupled to the memory, the memory and the one or more processors configured to:
transmit, to a base station, a physical random access channel procedure (PRACH) message that includes a request for physical uplink shared channel (PUSCH) repetition associated with a radio resource control (RRC) connection request message of a random access channel (RACH) procedure, wherein the request includes a PRACH preamble selected from a subset of PRACH preambles of a set of PRACH preambles, the subset of the PRACH preambles being indictive of the request for PUSCH repetition; and
transmit at least one PUSCH repetition associated with the RRC connection request message based at least in part on the request.

29. The UE of claim 28, wherein the memory and the one or more processors, when transmitting the request for PUSCH repetition, are configured to repeat the PRACH message over a plurality of RACH occasions.

30. The UE of claim 28, wherein the memory and the one or more processors, when transmitting the request for PUSCH repetition, are configured to transmit the PRACH message using a subset of RACH occasions (ROs) of a set of ROs.

31. The UE of claim 28, wherein the memory and the one or more processors, when transmitting the PRACH message, are configured to transmit the PRACH message based at least in part on one or more PRACH parameters.

32. A user equipment (UE) for wireless communication, comprising:
a memory; and
one or more processors operatively coupled to the memory, the memory and the one or more processors configured to:
transmit, to a base station and based at least in part on a determination that one or more trigger criteria are satisfied, a physical random access channel procedure (PRACH) message that includes a request for physical uplink shared channel (PUSCH) repetition associated with a radio resource control (RRC) connection request message of a random access channel (RACH) procedure, wherein the request includes a PRACH preamble selected from a subset of PRACH preambles of a set of PRACH preambles, the subset of the PRACH preambles being indictive of the request for PUSCH repetition and the one or more trigger criteria comprise a reference signal received power threshold; and
transmit at least one PUSCH repetition associated with the RRC connection request message based at least in part on the request.

33. The UE of claim 32, wherein the memory and the one or more processors, when transmitting the request for PUSCH repetition, are configured to transmit a PRACH message that indicates the request for PUSCH repetition.

34. The UE of claim 32, wherein the memory and the one or more processors are further configured to determine a first synchronization signal block (SSB) based reference signal received power (RSRP), wherein memory and the one or more processors, when determining that the one or more trigger criteria are satisfied, are configured to determine that the first SSB based RSRP satisfies the RSRP threshold.

35. A user equipment (UE) for wireless communication, comprising:
a memory; and
one or more processors operatively coupled to the memory, the memory and the one or more processors configured to:
transmit, to a base station and based at least in part on a determination that one or more trigger criteria are satisfied, a physical random access channel procedure (PRACH) message that includes a request for physical uplink shared channel (PUSCH) repetition associated with a radio resource control (RRC) connection request message of a random access channel (RACH) procedure, wherein the request includes a PRACH preamble selected from a subset of PRACH preambles of a set of PRACH preambles, the subset of the PRACH preambles being indictive of the request for PUSCH repetition and the one or more trigger criteria comprise a reference signal received power threshold;
receive, from the base station, an indication of a PUSCH repetition request grant, wherein the PUSCH repetition request grant corresponds to at least a portion of the PUSCH repetition request; and
transmit at least one PUSCH repetition associated with the RRC connection request message based at least in part on the request.

36. The UE of claim 35, wherein the indication of the PUSCH repetition request grant is carried in a random access response (RAR) message.

37. A base station for wireless communication, comprising:
a memory; and
one or more processors operatively coupled to the memory, the memory and the one or more processors configured to:
receive, from a user equipment (UE), a request for physical uplink shared channel (PUSCH) repetition associated with a radio resource control (RRC) connection request message of a random access channel (RACH) procedure, wherein the request includes a physical RACH (PRACH) preamble selected from a subset of PRACH preambles of a set of PRACH preambles, the subset of the PRACH preambles being indictive of the request for PUSCH repetition; and
receive at least one PUSCH repetition associated with the RRC connection request message based at least in part on the request.

38. The base station of claim 37, wherein the memory and the one or more processors, when receiving the request for PUSCH repetition, are configured to receive a PRACH message that indicates the request for PUSCH repetition.

39. The base station of claim 38, wherein the memory and the one or more processors, when receiving the PRACH message, are configured to receive the PRACH message based at least in part on one or more PRACH parameters, and wherein a selection of the one or more PRACH parameters is based at least in part on a relationship between the one or more PRACH parameters and one or more request parameters corresponding to the request for PUSCH repetition.

40. The base station of claim 39, wherein the memory and the one or more processors are further configured to transmit, to the UE, a parameter configuration that indicates the relationship.

41. The base station of claim 37, wherein the memory and the one or more processors, when receiving the request for PUSCH repetition, are configured to receive the request for PUSCH repetition based at least in part on a determination that one or more trigger criteria are satisfied, and wherein the memory and the one or more processors are further configured to transmit, to the UE, a trigger configuration that indicates the one or more trigger criteria.

42. The base station of claim 37, wherein the memory and the one or more processors are further configured to:
transmit, to the UE, a random access response (RAR) message, wherein the RAR message indicates at least one of:
a PUSCH resource for the RRC connection request message, or
a PUSCH parameter associated with the RRC connection request message.

43. The base station of claim 37, wherein the memory and the one or more processors are further configured to transmit, to the UE, an indication of a PUSCH repetition request grant, wherein the PUSCH repetition request grant corresponds to at least a portion of the PUSCH repetition request.

44. The base station of claim 43, wherein the indication of the PUSCH repetition request grant is carried in a random access response (RAR) message.

45. A method of wireless communication performed by a user equipment (UE), comprising:
transmitting, to a base station, a request for physical uplink shared channel (PUSCH) repetition associated with a radio resource control (RRC) connection request message of a random access channel (RACH) procedure, wherein the request includes a physical RACH (PRACH) preamble selected from a subset of PRACH preambles of a set of PRACH preambles, the subset of the PRACH preambles being indictive of the request for PUSCH repetition; and
transmitting at least one PUSCH repetition associated with the RRC connection request message based at least in part on the request.

46. The method of claim 45, wherein transmitting the request for PUSCH repetition comprises transmitting a PRACH message that indicates the request for PUSCH repetition.

47. The method of claim 46, wherein transmitting the request for PUSCH repetition comprises transmitting the PRACH message using a subset of RACH occasions (ROs) of a set of ROs.

48. The method of claim 45, further comprising determining that one or more trigger criteria are satisfied, wherein transmitting the request for PUSCH repetition comprises transmitting the request for PUSCH repetition based at least in part on determining that the one or more trigger criteria are satisfied.

49. The method of claim 48, wherein the one or more trigger criteria comprise a first reference signal received power (RSRP) threshold.

50. The method of claim 45, further comprising receiving, from the base station, an indication of a PUSCH repetition request grant, wherein the PUSCH repetition request grant corresponds to at least a portion of the PUSCH repetition request.

* * * * *